United States Patent
Chen et al.

(10) Patent No.: US 11,700,384 B2
(45) Date of Patent: Jul. 11, 2023

(54) SIGNALING PICTURE SIZE IN VIDEO CODING

(71) Applicant: QUALCOMM Incorporated, San Diego, CA (US)

(72) Inventors: Ying Chen, San Diego, CA (US); Marta Karczewicz, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/657,563

(22) Filed: Mar. 31, 2022

(65) Prior Publication Data

US 2022/0295076 A1    Sep. 15, 2022

Related U.S. Application Data

(63) Continuation of application No. 14/449,034, filed on Jul. 31, 2014, now abandoned, which is a
(Continued)

(51) Int. Cl.
*H04N 19/157* (2014.01)
*H04N 19/46* (2014.01)
(Continued)

(52) U.S. Cl.
CPC ......... *H04N 19/157* (2014.11); *H04N 19/122* (2014.11); *H04N 19/172* (2014.11);
(Continued)

(58) Field of Classification Search
None
See application file for complete search history.

(56) References Cited

U.S. PATENT DOCUMENTS

| 6,078,617 A | 6/2000 | Nakagawa et al. |
| 7,170,937 B2 | 1/2007 | Zhou |

(Continued)

FOREIGN PATENT DOCUMENTS

| EP | 2424246 A1 | 2/2012 |
| EP | 2533537 A1 | 12/2012 |

(Continued)

OTHER PUBLICATIONS

Britanak V., et al., "Discrete Cosine and Sine Transforms: General Properties, Fast Algorithms and Integer Approximations", Acadmemic Press, 2007, pp. 16-38.
(Continued)

*Primary Examiner* — Mikhail Itskovich
(74) *Attorney, Agent, or Firm* — Shumaker & Sieffert, PA

(57) ABSTRACT

A video encoder is configured to determine a picture size for one or more pictures included in a video sequence. The picture size associated with the video sequence may be a multiple of an aligned coding unit size for the video sequence. In one example, the aligned coding unit size for the video sequence may comprise a minimum coding unit size where the minimum coding unit size is selected from a plurality of smallest coding unit sizes corresponding to different pictures in the video sequence. A video decoder is configured to obtain syntax elements to determine the picture size and the aligned coding unit size for the video sequence. The video decoder decodes the pictures included in the video sequence with the picture size, and stores the decoded pictures in a decoded picture buffer.

8 Claims, 5 Drawing Sheets

Related U.S. Application Data continuation of application No. 13/550,384, filed on Jul. 16, 2012, now abandoned.

(60) Provisional application No. 61/549,480, filed on Oct. 20, 2011, provisional application No. 61/530,819, filed on Sep. 2, 2011, provisional application No. 61/508,659, filed on Jul. 17, 2011.

(51) Int. Cl.
*H04N 19/172* (2014.01)
*H04N 19/122* (2014.01)
*H04N 19/96* (2014.01)
*H04N 19/177* (2014.01)

(52) U.S. Cl.
CPC .......... *H04N 19/46* (2014.11); *H04N 19/177* (2014.11); *H04N 19/96* (2014.11)

(56) References Cited

U.S. PATENT DOCUMENTS

| | | |
|---|---|---|
| 7,586,924 B2 | 9/2009 | Wiegand |
| 7,852,919 B2 | 12/2010 | Crinon et al. |
| 7,933,334 B2 | 4/2011 | Kanehara |
| 8,503,527 B2 | 8/2013 | Chen et al. |
| 8,542,740 B2 | 9/2013 | Ohgose |
| 8,711,935 B2 | 4/2014 | Kim et al. |
| 9,282,340 B2 | 3/2016 | Suzuki et al. |
| 9,426,461 B2 | 8/2016 | Fu et al. |
| 2005/0157797 A1 | 7/2005 | Gaedke |
| 2006/0072669 A1* | 4/2006 | Lin .................. H04N 19/59 375/E7.199 |
| 2007/0036215 A1 | 2/2007 | Pan et al. |
| 2008/0095228 A1 | 4/2008 | Hannuksela et al. |
| 2009/0052534 A1 | 2/2009 | Wang et al. |
| 2009/0125538 A1 | 5/2009 | Rosenzweig et al. |
| 2009/0262835 A1 | 10/2009 | Srinivasan et al. |
| 2009/0290642 A1 | 11/2009 | Ohgose |
| 2010/0054331 A1 | 3/2010 | Haddad et al. |
| 2010/0086029 A1 | 4/2010 | Chen et al. |
| 2010/0086032 A1 | 4/2010 | Chen et al. |
| 2010/0098156 A1 | 4/2010 | Karczewicz et al. |
| 2010/0254458 A1 | 10/2010 | Amon et al. |
| 2011/0096834 A1 | 4/2011 | Cheon et al. |
| 2011/0194613 A1 | 8/2011 | Chen et al. |
| 2012/0106652 A1* | 5/2012 | Huang .................. H04N 19/70 375/E7.076 |
| 2013/0016769 A1 | 1/2013 | Chen et al. |
| 2013/0266232 A1 | 10/2013 | Sato |
| 2013/0308701 A1 | 11/2013 | Chen et al. |
| 2014/0341275 A1 | 11/2014 | Chen et al. |

FOREIGN PATENT DOCUMENTS

| | | |
|---|---|---|
| EP | 2536151 A2 | 12/2012 |
| EP | 2645715 A2 | 10/2013 |
| EP | 2658262 A2 | 10/2013 |
| EP | 2665269 A1 | 11/2013 |
| EP | 2712192 A2 | 3/2014 |
| EP | 2882190 A1 | 6/2015 |
| JP | 2009044337 A | 2/2009 |
| RU | 2330325 C2 | 7/2008 |
| RU | 2391794 C2 | 6/2010 |
| WO | 03105070 A1 | 12/2003 |
| WO | 2004032032 A1 | 4/2004 |
| WO | 2007004678 A1 | 1/2007 |
| WO | 2008145560 A1 | 12/2008 |
| WO | 2010032941 A2 | 3/2010 |
| WO | 2010039733 A2 | 4/2010 |
| WO | 2011031332 A1 | 3/2011 |
| WO | 2011126348 A2 | 10/2011 |
| WO | 2011152635 A2 | 12/2011 |
| WO | 2012092761 A1 | 7/2012 |
| WO | 2012092763 A1 | 7/2012 |
| WO | 2012094908 A1 | 7/2012 |
| WO | 2012096229 A1 | 7/2012 |
| WO | 2012119569 A1 | 9/2012 |
| WO | 2012126045 A1 | 9/2012 |
| WO | 2012164902 A1 | 12/2012 |
| WO | 2013012864 | 1/2013 |

OTHER PUBLICATIONS

Bross B., et al., "High Efficiency Video Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, Document: JCTVC-L1003_v34, 12th Meeting, Geneva, CH, Jan. 14-23, 2013, entire document, 310 pages.

Bross B., et al., "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, 8th Meeting: San Jose, CA, USA, 99. MPEG Meeting, Feb. 1-10, 2012, 34, 54-55, 74-75, 90-98, 220-224, URL: http://wftp3.itu.int/AV-ARCH/JCTVC-SITE/, XP030111769, 259 Pages.

Bross B., et al., "High Efficiency Video Coding (HEVC) Text Specification Draft 7," JCTVC-I1003 d2, 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.1tu.int/av-arch/jctvc-site/ , No. JCTVC-I1003, May 10, 2012 (May 10, 2012), XP030112373, 290 pages.

Bross B., et al., "High Efficiency Video Coding (HEVC) Text Specification Draft 8", Jul. 11-20, 2012, 10. JCT-VC Meeting, 101. MPEG Meeting, Stockholm; (Joint Collaborative Team On Video Coding of ISO/IEC JTC1/SC29/WG11 and ITU-T SG.16); URL: http://wftp3.itu.int/av-arch/jctvc-site/,, No. JCTVC-J1003_d7, XP030112947, Jul. 28, 2012 (Jul. 28, 2012), pp. 197-201, section A.4.1 ,A.4.2, 260 Pages.

Bross B., et al., "WD4: Working Draft 4 of High-Efficiency Video Coding," JCTVC-F803_d2, (JCT-VC) of ITU-T SG16 WP3 and ISO/IEC JTC1/SC29/WG11) Joint Collaborative Team on Video Coding, 6th Meeting, Torino, IT, Jul. 14-22, 2011, No. m21449. Nov. 20, 2011 (Nov. 20, 2011), XP030050012, [retrieved on Jul. 14, 2011].

Bross B., et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pages.

Cassa., et al., "Abstract: Fast Rate Distortion Optimization for the Emerging HEVC Standard," IEEE.org, May 2012, 3 pp.

Chen Y., et al., "Picture size signaling", Joint Collaborative Team on Video Coding (JCT-VC) of ITU-T SG16 WP3 and ISO/IEC JTC1/SC29/WG11, 7th Meeting: Geneva, CH, Nov. 2011, JCTVC-G325, pp. 1-3.

Decision on Appeal issued in U.S. Appl. No. 13/550,384 on Aug. 23, 2018, 11 pp.

Decision on Appeal issued in U.S. Appl. No. 14/449,034 on Jul. 2, 2018, 14 pp.

Drugeon V., et al., "Improvements of SPS syntax", Joint Collaborative Team on Video Coding (JCT-VC) of ITU-T SG16 WP3 and ISO/IEC JTC1/SC29/WG11, 6th Meeting: Torino, IT, Jul. 1, 2011, JCTVC-F523, pp. 1-7.

Guo M., et al., "CE14 Subtest 1: The Most Probable Mode Signaling for Luma", 5th Meeting: Geneva, Switzerland, Mar. 16-23, 2011, ISSN 0000-0007, Joint Collaborative Team on Video Coding (JCT-VC) of ITU-T SG16 WP3 and ISO/IEC JTC1/SC29/WG11, JCTVC-E088, XP030008594, Mar. 18, 2011, 4 pages.

Han W-J., et al., "Improved Video Compression Efficiency Through Flexible Unit Representation and Corresponding Extension of Cod-

(56) References Cited

OTHER PUBLICATIONS ing Tools," IEEE Transactions on Circuits and Systems for Video Technology, vol. 20, No. 12, Dec. 2010, pp. 1709-1720.
Hsu C W., et al., "CE4 Subset1: Leaf-CU-Aligned Slices [online]," Joint Collaborative Team on Video Coding (JCT-VC) of ITU-T SG16 WP3 and ISO/IEC JTC1/SC29/WG11 JCTVC-E043, http://phenix.it-sudparis.eu/jct/doc_end_user/documents/5_Geneva/wg11/JCTVC-E043-v3.zip, Mar. 2011.
Hsu C.H., et al., "CE4 Subset1: Leaf-CU-Aligned Slices", Joint Collaborative Team on Video Coding (JCT-VC) of ITU-T SG16 WP3 and ISO/IEC JTC1/SC29/WG11, 5th Meeting: Geneva, CH, Mar. 2011, JCTVC-E043_r1, pp. 1-7.
Hsu C.H., et al., "Syntax for Leaf Coding Unit Aligned Slices", Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D127_r1, pp. 1-13.
Hsu C-W., et al., "Syntax for Leaf Coding Unit Aligned Slices", 4th Meeting, Jan. 20, 2011-Jan. 28, 2011, 95. MPEG Meeting; Jan. 24, 2011-Jan. 28, 2011; Daegu; (Motion Picture Expert Group or ISO/IEC JTC1/SC29/WG11), No. m18879, Jan. 23, 2011 (Jan. 23, 2011), pp. 1-13, XP030047448.
Huang Y-H., et al., "Fast Decision of Block Size, Prediction Mode, and Intra Block for H.264 Intra Prediction," IEEE Transactions on Circuits and Systems for Video Technology, Aug. 2010, vol. 20, No. 8, pp. 1122-1132.
International Preliminary Report on Patentability—PCT/US2012/047066—The International Bureau of WIPO Geneva Switzerland dated Nov. 7, 2013.
International Search Report and Written Opinion—PCT/US2012/047066—ISA/EPO—dated Oct. 29, 2012, 14 pp.
ITU-T H.223, "Series H: Audiovisual and Multimedia Systems, Infrastructure of Audiovisual Services—Transmission Multiplexing and Synchronization, Multiplexing Protocol for Low Bit Rate Multimedia Communication", The International Telecommunication Union, Jul. 2001, 74 Pages.
ITU-T H.263, "Video Coding for Low Bit Rate Communication", Series H: Audiovisual and Multimedia Systems, Infrastructure of audiovisual services—Coding of moving video, Jan. 2005, 226 pages.
ITU-T H.264, Series H: Audiovisual and Multimedia Systems, Infrastructure of Audiovisual Services—Coding of Moving Video, Advanced Video Coding for Generic Audiovisual Services, The International Telecommunication Union, Jun. 2011, 674 Pages.
ITU-T H.265, Series H: Audiovisual and Multimedia Systems, Infrastructure of Audiovisual Services—Coding of Moving Video, High Efficiency Video Coding, The International Telecommunication Union, Apr. 30, 2013, 317 Pages, (pp. 227-228,231, 237-241, 250-251, 276-278), Retrieved from the Internet: https://www.itu.int/rec/dologin_pub.asp?lang=e&id=H.265-201304-S!!PDF-E&type=items.
Liu, S. et al., "Syntax and structure for coding and utilizing partition types [online]," Joint Collaborative Team on Video Coding (JCT-VC) of ITU-T SG16 WP3 and ISO/IEC JTC1/SC29/WG11 JCTVC-E081, http://phenix.it-sudparis.eu/jct/doc_end_user/documents/5_Geneva/wg11/JCTVC-E081-v2.zip, Mar. 2011.
Marpe, et al, "Video Compression Using Nested Quadtree Structures, Leaf Merging, and Improved Techniques for Motion Representation and Entropy Coding," IEEE Transactions on Circuits and Systems for Video Technology, Dec. 2010, pp. 1676-1687, vol. 20, No. 12.
Non-Final Office Action issued in U.S. Appl. No. 13/550,384 dated Nov. 1, 2018, 34 pp.
Notice of Grounds for Rejection from corresponding Korean Application Serial No. 2014-7004055 dated Jul. 2, 2014 (includes English translation) 6 pages.
Office Action from U.S. Appl. No. 13/550,384, dated Nov. 4, 2014, 20 pp.

Office Action from U.S. Appl. No. 14/449,034 dated Jan. 26, 2015, 14 pp.
Proposed Amendment to Accompany Interview Request dated Dec. 15, 2014 from U.S. Appl. No. 14/449,034, filed Jan. 15, 2015, 9 pp.
Reply to Second Written Opinion dated Jun. 28, 2013, from international application No. PCT/US2012/047066, dated Aug. 28, 2013, 22 pp.
Reply to Written Opinion dated Oct. 29, 2012, from international application No. PCT/US2012/047066, dated May 17, 2013, 24 pp.
Response to First Action Interview Pilot Program Pre-Interview Communication dated Dec. 15 from U.S. Appl. No. 14/449,034, filed Jan. 15, 2015, 1 pp.
Response to Office Action dated Nov. 4, 2014, from U.S. Appl. No. 13/550,384, filed Feb. 4, 2015, 16 pp.
Second Written Opinion from international application No. PCT/US2012/047066, dated Jun. 28, 2013,6 pp.
Shi., "High Performance Intra Algorithm and Parallel Hardware Architecture for the Next Generation Video Coding," University of Tokushima, Jan. 2018, 102 pp.
Taiwan Search Report—TW101125715—TIPO—dated Jan. 17, 2015, 1 pp.
Tan T.K., et al., "CE14.1: Results for DOCOMO's proposal and cross verification of MediaTek's implementation for the most probable mode signalling for luma," Joint Collaborative Team on Video Coding (JCT-VC) of ITU-T SG16 WP3 and ISO/IEC JTC1/SC29/WG11, 5th Meeting, Geneva, CH, Mar. 16-23, 2011, Document: JCTVC-E131, 8 pages.
Wenger S., et al., "H.26L over IP and H.324 Framework", H264, Sep. 18, 2001 (Sep. 18, 2001), pp. 1-14, XP040416672.
Wiegand T., et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 Pages.
Wiegand T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 Pages.
Wiegand T., et al., "WD3: Working Draft 3 of High-Efficiency Video Coding", JCTVC-E603_d8, Joint Collaborative Team on Video Coding (JCT-VC) of ITU-T SG16 WP3 and ISO/IEC JTC1/SC29/WG11, XP030009014, Document JCTVC-E603, 5th Meeting, Geneva, CH, Mar. 16-23, 2011, 239 Pages, Paragraph [8.6.1], Tables 8-13, ISSN:0000-0003.
Wiegand T: "Test Model Under Consideration", 2.JCT-VC Meeting, Jul. 21, 2010-Jul. 28, 2010, Geneva, (Joint Collaborative Team on Video Coding of ISO/IEC JTC1/SC29/WG11 and ITU-T SG.16), No. JCTVC-B205, (Output Document (Draft007)) Jul. 28, 2010 (Jul. 28, 2010), pp. 1-189, XP030233222, Retrieved from the Internet: URL: https://www.itu.int/wftp3/av-arch/jctvc-site/2010_07_B_Geneva/JCTVC-B205.zip, JCTVC-B205_draft007.doc [retrieved on Mar. 19, 2012], Published on Sep. 10, 2010 as per Wayback Machine.
Winken M., et al., "Highly Efficient Video Coding based on Quadtree Structures, Improved Motion Compensation and Probability Interval Partitioning Entropy Coding", 14th ITG Conference on Electronic Media Technology (CEMT), Mar. 23, 2011 (Mar. 23, 2011), pp. 1-6, IEEE, XP031953985, ISBN: 978-1-4577-1269-2.
Yamamoto T., et al., "Flexible Representation of Intra Prediction Modes," Joint Collaborative Team on Video Coding (JCT-VC) of ITU-T SG16 WP3 and ISO/IEC JTC1/SC29/WG11, 2nd Meeting, Geneva, CH, Jul. 21-28, 2010, Document: JCTVC-B063, 7 pages.
Zeng H., et al., "Hierarchical Intra Mode Decision for H.264/AVC," IEEE Transactions on Circuits and Systems for Video Technology, Jun. 2010, vol. 20, No. 6, pp. 907-912.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

* cited by examiner

SIGNALING PICTURE SIZE IN VIDEO CODING

This application is a continuation of U.S. application Ser. No. 14/449,034, filed Jul. 31, 2014, which is a continuation of U.S. application Ser. No. 13/550,384, filed Jul. 16, 2012, which claims the benefit of:

U.S. Provisional Application No. 61/508,659, filed Jul. 17, 2011;

U.S. Provisional Application No. 61/530,819, filed Sep. 2, 2011; and

U.S. Provisional Application No. 61/549,480, filed Oct. 20, 2011.

Each of the above-referenced applications is hereby incorporated by reference in its entirety.

TECHNICAL FIELD

This disclosure relates to the field of video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. Video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding video data included in pictures or frames of a video sequence. In particular, this disclosure describes techniques where a picture size for a group of pictures in the video sequence may be coded based on an aligned coding unit size for the video sequence. The aligned coding unit size for the video sequence may be selected from several possible coding unit sizes supported by the video coding scheme. The techniques of this disclosure include signaling an aligned coding unit size for one or more of the pictures in the video sequence, and coding a size for the one or more pictures as a multiple of the smallest coding unit.

In one example of the disclosure, a method for encoding video data comprises determining a smallest coding unit size for each of a plurality of pictures defining a video sequence, wherein a smallest coding unit size is selected from a plurality of possible coding unit sizes including a maximum possible coding unit size; determining an aligned coding unit size for the video sequence based on the plurality of possible coding unit sizes; determining a picture size associated with the video sequence, wherein the picture size associated with the video sequence is an multiple of the aligned coding unit size; and signaling the aligned coding unit size value in sequence level syntax information.

In another example, a method of decoding video data comprises obtaining a coded video sequence including a first picture coded using a first smallest coding unit size and a second picture coded using second smallest coding unit size; obtaining a picture size of a decoded picture to be stored in a decoded picture buffer wherein the picture size is a multiple of one of the first coding unit size, the second coding unit size, or a maximum coding unit size; and storing the decoded picture in a decoded picture buffer.

In another example, an apparatus for encoding video data comprises a video encoding device configured to determine a smallest coding unit size for each of a plurality of pictures defining a video sequence, wherein a smallest coding unit size is selected from a plurality of possible coding unit sizes including a maximum possible coding unit size; determine an aligned coding unit size for the video sequence based on the plurality of possible coding unit sizes; determine a picture size associated with the video sequence, wherein the picture size associated with the video sequence is an multiple of the aligned coding unit size; and signal the aligned coding unit size value in sequence level syntax information.

In another example, an apparatus for decoding video data comprises a video decoding device configured to obtain a coded video sequence including a first picture coded using a first smallest coding unit size and a second picture coded using second smallest coding unit size; obtain a picture size of a decoded picture to be stored in a decoded picture buffer wherein the picture size is a multiple of one of the first coding unit size, the second coding unit size, or a maximum coding unit size; and store the decoded picture in a decoded picture buffer.

In another example, a device for encoding video data comprises means for determining a smallest coding unit size for each of a plurality of pictures defining a video sequence, wherein a smallest coding unit size is selected from a plurality of possible coding unit sizes including a maximum possible coding unit size; means for determining an aligned coding unit size for the video sequence based on the plurality of possible coding unit sizes; means for determining a picture size associated with the video sequence, wherein the picture size associated with the video sequence is an multiple of the aligned coding unit size; and means for signaling the aligned coding unit size value in sequence level syntax information.

In another example, a device for decoding video data comprises means for obtaining a coded video sequence including a first picture coded using a first smallest coding unit size and a second picture coded using second smallest coding unit size; means for obtaining a picture size of a decoded picture to be stored in a decoded picture buffer wherein the picture size is a multiple of one of the first coding unit size, the second coding unit size, or a maximum coding unit size; and means storing the decoded picture in a decoded picture buffer.

In another example, a computer-readable storage medium comprises instructions stored thereon that, when executed, cause a processor of a device for encoding video data to determine a smallest coding unit size for each of a plurality of pictures defining a video sequence, wherein a smallest coding unit size is selected from a plurality of possible coding unit sizes including a maximum possible coding unit size; determine an aligned coding unit size for the video sequence based on the plurality of possible coding unit sizes; determine a picture size associated with the video sequence, wherein the picture size associated with the video sequence is an multiple of the aligned coding unit size; and signal the aligned coding unit size value in sequence level syntax information.

In another example, a computer-readable storage medium comprises instructions stored thereon that, when executed, cause a processor of a device for decoding video data to obtain a coded video sequence including a first picture coded using a first smallest coding unit size and a second picture coded using second smallest coding unit size; obtain a picture size of a decoded picture to be stored in a decoded picture buffer wherein the picture size is a multiple of one of the first coding unit size, the second coding unit size, or a maximum coding unit size; and store the decoded picture in a decoded picture buffer.

The details of one or more examples are set forth in the accompanying drawings and the description below. Other features, objects, and advantages will be apparent from the description and drawings, and from the claims.

DETAILED DESCRIPTION

A video sequence may include a group of pictures. Each picture in the group of pictures may have a smallest coding unit size. In one example, the smallest coding unit size may be a rectangle or square with one of the following pixel or sample dimensions: four pixels, eight pixels, 16 pixels, 32 pixels, and 64 pixels. In order to increase coding efficiency of the video sequence, it may be useful to determine the smallest coding unit size for the video sequence and specify a picture size for the group of pictures where the picture size is a multiple of the minimum of the smallest coding unit size for the video sequence.

Figure 1:
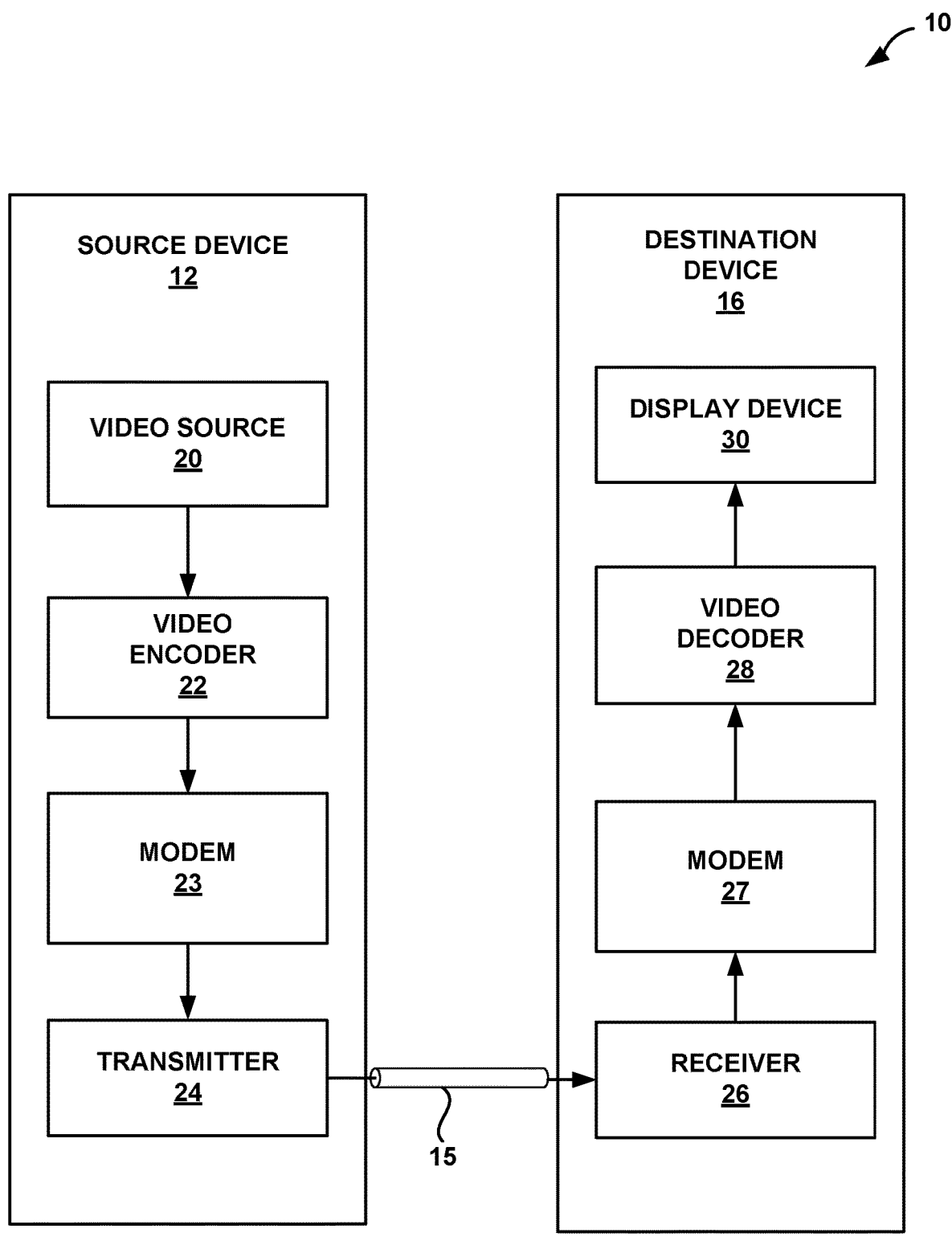
FIG. 1 is a block diagram illustrating an example video encoding and decoding system.

FIG. 1 is a block diagram illustrating one example of a video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply generally to the encoding and decoding may be applied to non-wireless devices including video encoding and/or decoding capabilities. Source device 12 and destination device 16 are merely examples of coding devices that can support the techniques described herein.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30.

Video source 20 may comprise a video capture device, such as a video camera, a video archive containing previously captured video, a video feed from a video content provider or another source of video. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

In some examples (but not all cases), once the video data is encoded by video encoder 22, the encoded video information may then be modulated by modem 23 according to a communication standard, e.g., such as code division multiple access (CDMA), orthogonal frequency division multiplexing (OFDM) or any other communication standard or technique. The encoded and modulated data can then be transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas. Receiver 26 of destination device 16 receives information over channel 15, and modem 27 demodulates the information. The video decoding process performed by video decoder 28 may include reciprocal techniques to the encoding techniques performed by video encoder 22.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Again, FIG. 1 is merely on example and the techniques of this disclosure may apply to video coding settings (e.g., video encoding or video decoding) that do not necessarily include any data communication between the encoding and decoding devices. In other examples, data could be retrieved from a local memory, streamed over a network, or the like. An encoding device may encode and store data to memory, and/or a decoding device may retrieve and decode data from memory. In many cases, the encoding and decoding is performed by unrelated devices that do not communicate with one another, but simply encode data to memory and/or retrieve and decode data from memory. For example, after video data has been encoded, the video data may be packetized for transmission or storage. The video data may be assembled into a video file conforming to any of a variety of standards, such as the International Organization for Standardization (ISO) base media file format and extensions thereof, such as AVC.

In some cases, video encoder 22 and video decoder 28 may operate substantially according to a video compression standard such as the emerging HEVC standard. However, the techniques of this disclosure may also be applied in the context of a variety of other video coding standards, including some old standards, or new or emerging standards. Although not shown in FIG. 1, in some cases, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In this disclosure, the term coder refers to an encoder, a decoder, or CODEC, and the terms coder, encoder, decoder and CODEC all refer to specific machines designed for the coding (encoding and/or decoding) of video data consistent with this disclosure. In this disclosure, the term "coding" may refer to either or both of encoding and/or decoding.

In some cases, source device 12 and destination device 16 may operate in a substantially symmetrical manner. For example, each of source device 12 and destination device 16 may include video encoding and decoding components. Hence, system 10 may support one-way or two-way video transmission between source device 12 and destination device 16, e.g., for video streaming, video playback, video broadcasting, or video telephony.

Video encoder 22 and video decoder 28 may perform predictive coding in which a video block being coded is compared to one or more predictive candidates in order to identify a predictive block. Video blocks may exist within individual video frames or pictures (or other independently defined units of video, such as slices). Frames, slices, portions of frames, groups of pictures, or other data structures may be defined as units of video information that include video blocks. The process of predictive coding may be intra (in which case the predictive data is generated based on neighboring intra data within the same video frame or slice) or inter (in which case the predictive data is generated based on video data in previous or subsequent frames or slices). Video encoder 22 and video decoder 28 may support several different predictive coding modes. Video encoder 22 may select a desirable video coding mode. In predictive coding, after a predictive block is identified, the differences between the current video block being coded and the predictive block are coded as a residual block, and prediction syntax (such as a motion vector in the case of inter coding, or a predictive mode in the case of intra coding) is used to identify the predictive block. In some cases, the residual block may be transformed and quantized. Transform techniques may comprise a DCT process or conceptually similar process, integer transforms, wavelet transforms, or other types of transforms. In a DCT process, as an example, the transform process converts a set of pixel values (e.g., residual pixel values) into transform coefficients, which may represent the energy of the pixel values in the frequency domain. Video encoder 22 and video decoder 28 may apply quantization to the transform coefficients. Quantization generally involves a process that limits the number of bits associated with any given transform coefficient.

Following transform and quantization, video encoder 22 and video decoder 28 may perform entropy coding on the quantized and transformed residual video blocks. Video encoder 22 may generate syntax elements as part of the encoding process to be used by video decoder 28 in the decoding process. Video encoder 22 may also entropy encode syntax elements and include syntax elements in the encoded bitstream. In general, entropy coding comprises one or more processes that collectively compress a sequence of quantized transform coefficients and/or other syntax information. Video encoder 22 and video decoder 28 may perform scanning techniques on the quantized transform coefficients in order to define one or more serialized one-dimensional vectors of coefficients from two-dimensional video blocks. The scanned coefficients may then entropy coded along with any syntax information, e.g., via content adaptive variable length coding (CAVLC), context adaptive binary arithmetic coding (CABAC), or another entropy coding process.

In some examples, as part of the encoding process, video encoder 22 may decode encoded video blocks in order to generate the video data that is used for subsequent prediction-based coding of subsequent video blocks. This is often referred to as a decoding loop of the encoding process, and generally mimics the decoding that is performed by a decoder device. In the decoding loop of an encoder or a decoder, filtering techniques may be used to improve video quality, and e.g., smooth pixel boundaries and possibly remove artifacts from decoded video. This filtering may be in-loop or post-loop. With in-loop filtering, the filtering of reconstructed video data occurs in the coding loop, which means that the filtered data is stored by an encoder or a decoder for subsequent use in the prediction of subsequent image data. In contrast, with post-loop filtering the filtering of reconstructed video data occurs out of the coding loop, which means that unfiltered versions of the data are stored by an encoder or a decoder for subsequent use in the prediction of subsequent image data. The loop filtering often follows a separate deblock filtering process, which typically applies filtering to pixels that are on or near boundaries of adjacent video blocks in order to remove blockiness artifacts that manifest at video block boundaries.

Efforts are currently in progress to develop a new video coding standard, currently referred to as High Efficiency Video Coding (HEVC). The upcoming standard is also referred to as H.265. A recent draft of the HEVC standard, referred to as "HEVC Working Draft 3" or "WD3," is described in document JCTVC-E603, Wiegand et al., "High efficiency video coding (HEVC) text specification draft 3," Joint Collaborative Team on Video Coding (JCT-VC) of ITU-T SG16 WP3 and ISO/IEC JTC1/SC29/WG11, 5th Meeting: Geneva, CH, 16-23 Mar. 2011, which is hereby incorporated by reference in its entirety. The standardization efforts are based on a model of a video coding device referred to as the HEVC Test Model (HM). The HM presumes several capabilities of video coding devices over devices configured to code video data according to ITU-T H.264/AVC. For example, whereas H.264 provides nine intra-prediction encoding modes, HM provides as many as thirty-four intra-prediction encoding modes. Video encoder 22 may operate on blocks of video data consistent with the HEVC standard and HEVC Test Model.

The HEVC standard includes specific terms and block sizes for blocks of video data. In particular, HEVC includes the terms largest coding unit (LCU), coding unit (CU), prediction unit (PU), and transform unit (TU). LCUs, CUs, PUs, and TUs are all video blocks within the meaning of this disclosure. This disclosure also uses the term block to refer to any of a LCU, CU, PU, or TU. In HEVC, syntax elements may be defined at the LCU level, the CU level, the PU level and the TU level. In HEVC, an LCU refers to the largest sized coding unit which is a largest coding unit in terms of number of pixels supported in a given situation. In general, in HEVC a CU has a similar purpose to a macroblock of H.264, except that a CU does not have a size distinction. Thus, a CU may be split into sub-CUs and an LCU may be partitioned into smaller CUs. Further, the CUs may be partitioned into prediction units (PUs) for purposes of prediction. A PU may represent all or a portion of the corresponding CU, and may include data for retrieving a reference sample for the PU. PUs may have square or rectangular shapes. TUs represent a set of pixel difference values or pixel residuals that may be transformed to produce transform coefficients, which may be quantized. Transforms are not fixed in the HEVC standard, but are defined according to transform unit (TU) sizes, which may be the same size as a given CU, or possibly smaller.

In HEVC, an LCU may be associated with a quadtree data structure. Further, in some examples residual samples corresponding to a CU may be subdivided into smaller units using a quadtree partitioning scheme which includes a quadtree structure known as "residual quad tree" (RQT). In general, a quadtree data structure includes one node per CU, where a root node may correspond to the LCU. For example, $CU_0$ may refer to the LCU, and $CU_1$ through $CU_4$ may comprise sub-CUs of the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag in the CU-level syntax to indicate whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU may also be referred to as leaf-CUs although there is no explicit splitting of the original leaf-CU. For example, if a CU at 16×16 size is not split further, the four 8×8 sub-CUs will also be referred to as leaf-CUs although the 16×16 CU was never split.

The leaf nodes or leaf-CUs of the RQT may correspond to TUs. That is, a leaf-CU may include a quadtree indicating how the leaf-CU is partitioned into TUs. A leaf-CU may include one or more transform units (TUs). This disclosure may refer to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs. A split flag may indicate whether a leaf-CU is split into four transform units. Then, each transform unit may be split further into four sub TUs. When a TU is not split further, it may be referred to as a leaf-TU.

Further, the leaf nodes or leaf-CUs may include one or more prediction units (PUs). For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

HEVC WD3 defines "display process" as "A process not specified in this Recommendation|International Standard having, as its input, the cropped decoded pictures that are the output of the decoding process."

HEVC WD3 defines a "layer" as "One of a set of syntactical structures in a non-branching hierarchical relationship. Higher layers contain lower layers. The coding layers are the coded video sequence, picture, slice, and treeblock layers."

HEVC WD3 defines a "primary coded picture" as "The coded representation of a picture to be used by the decoding process for a bitstream conforming to this Recommendation|International Standard. The primary coded picture contains all treeblocks of the picture. The only pictures that have a normative effect on the decoding process are primary coded pictures."

HEVC WD3 defines a "slice" as "An integer number of treeblocks ordered consecutively in the raster scan. For the primary coded picture, the division of each picture into slices is a partitioning. The treeblock addresses are derived from the first treeblock address in a slice (as represented in the slice header)."

HEVC WD3 defines a "treeblock" as "A N×N block of luma samples and two corresponding blocks of chroma samples of a picture that has three sample arrays, or a N×N block of samples of a monochrome picture or a picture that is coded using three separate colour planes. The division of a slice into treeblocks is a partitioning."

HEVC WD3 defines a "treeblock partition" as "A block of luma samples and two corresponding blocks of chroma samples resulting from a partitioning of a treeblock for inter prediction for a picture that has three sample arrays or a block of luma samples resulting from a partitioning of a treeblock for inter prediction for a monochrome picture or a picture that is coded using three separate colour planes."

HEVC WD3 describes spatial subdivision of pictures and slices as follows:

Pictures are divided into slices. A slice is a sequence of treeblocks.

Each treeblock is comprised of one NtbxNtb luma array and, when the chroma sampling format is not equal to 4:0:0 and separate_colour_plane_flag is equal to 0, two corresponding chroma sample arrays. When separate_colour_plane_flag is equal to 1, each treeblock is comprised of one NtbxNtb luma or chroma sample array.

When a picture is coded using three separate colour planes (separate_colour_plane_flag is equal to 1), a slice contains only treeblocks of one colour component being identified by the corresponding value of colour_plane_id, and each colour component array of a picture consists of slices having the same colour_plane_id value. Coded slices with different values of colour_plane_id within an access unit can be interleaved with each other under the constraint that for each value of colour_plane_id, the coded slice NAL units with that value colour_plane_id shall be in the order of increasing treeblock address for the first treeblock of each coded slice NAL unit.

Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree.

The prediction tree specifies the position and size of prediction blocks. The prediction tree and associated prediction data are referred to as prediction unit. The transform tree specifies the position and size of transform blocks. The transform tree and associated transform data are referred to as transform unit.

The splitting information for luma and chroma is identical for the prediction tree and may or may not be identical for the transform tree.

The coding node and the associated prediction and transform units form together a coding unit.

HEVC WD3 defines syntax for a coding tree as:

| | Descriptor |
|---|---|
| coding_tree( x0, y0, log2CUSize ) { | |
| if( x0 + ( 1 << log2CUSize ) <= PicWidthInSamplesL && y0 + ( 1 << log2CUSize ) <= PicHeightInSamplesL && log2CUSize > Log2MinCUSize ) | |
| split_coding_unit_flag[ x0 ][ y0 ] | u(1) \| ae(v) |
| if( adaptive_loop_filter_flag && alf_cu_control_flag ) { | |
| cuDepth = Log2MaxCUSize − log2CUSize | |
| if( cuDepth <= alf_cu_control_max_depth ) | |
| if( cuDepth == alf_cu_control_max_depth \|\| | |
| split_coding_unit_flag[ x0 ][ y0 ] == 0 ) | |
| AlfCuFlagIdx++ | |
| } | |
| if( split_coding_unit_flag[ x0 ][ y0 ] ) { | |
| x1 = x0 + ( ( 1 << log2CUSize ) >> 1 ) | |
| y1 = y0 + ( ( 1 << log2CUSize ) >> 1 ) | |
| coding_tree( x0, y0, log2CUSize − 1 ) | |
| if( x1 < PicWidthInSamplesL ) | |
| coding_tree( x1, y0, log2CUSize − 1 ) | |
| if( y1 < PicHeightInSamplesL ) | |
| coding_tree( x0, y1, log2CUSize − 1 ) | |
| if( x1 < PicWidthInSamplesL && y1 < PicHeightInSamplesL ) | |
| coding_tree( x1, y1, log2CUSize − 1 ) | |
| } else { | |
| if(adaptive_loop_filter_flag && alf_cu_control_flag ) | |
| AlfCuFlag[ x0 ][ y0 ] = alf_cu_flag[ AlfCuFlagIdx ] | |
| coding_unit( x0, y0, log2CUSize ) | |
| } | |
| } | |

HEVC WD3 defines syntax for a coding unit as:

| | Descriptor |
|---|---|
| coding_unit( x0, y0, log2CUSize ) { | |
| if( slice_type != I ) | |
| skip_flag[ x0 ][ y0 ] | u(1) \| ae(v) |
| if( skip_flag[ x0 ][ y0 ] ) | |
| prediction_unit( x0, y0, log2CUSize, log2CUSize, 0 , 0 ) | |
| else { | |
| if( cu_qp_delta_enabled_flag && !IsCuQpDeltaCoded ) { | |
| cu_qp_delta | se(v) \| ae(v) |
| IsCuQpDeltaCoded = 1 | |
| } | |
| if( slice_type != I \|\| log2CUSize == Log2MinCUSize ) | |

|  | Descriptor |
|---|---|
| pred_type | u(v) \| ae(v) |
| x1 = x0 + ( ( 1 << log2CUSize ) >> 1 ) | |
| y1 = y0 + ( ( 1 << log2CUSize ) >> 1 ) | |
| if( PartMode == PART_2Nx2N ) { | |
| prediction_unit( x0, y0, log2CUSize, log2CUSize, 0 , 0 ) | |
| } else if( PartMode == PART_2NxN ) { | |
| prediction_unit( x0, y0, log2CUSize, log2CUSize − 1, 0 , log2CUSize > Log2MinCUSize ) | |
| prediction_unit( x0, y1, log2CUSize, log2CUSize − 1, 1 , 0 ) | |
| } else if( PartMode == PART_Nx2N ) { | |
| prediction_unit( x0, y0, log2CUSize - 1, log2CUSize, 0 , log2CUSize > Log2MinCUSize ) | |
| prediction_unit( x1, y0, log2CUSize - 1, log2CUSize, 1 , 0 ) | |
| } else { /* PART_NxN */ | |
| prediction_unit( x0, y0, log2CUSize − 1, log2CUSize − 1, 0 , 0 ) | |
| prediction_unit( x1, y0, log2CUSize − 1, log2CUSize − 1, 1 , 0 ) | |
| prediction_unit( x0, y1, log2CUSize − 1, log2CUSize − 1, 2 , 0 ) | |
| prediction_unit( x1, y1, log2CUSize − 1, log2CUSize − 1, 3 , 0 ) | |
| } | |
| } | |
| transform_tree( x0, y0, log2CUSize, 0, 0 ) | |
| transform_coeff( x0, y0, log2CUSize, 0, 0 ) | |
| transform_coeff( x0, y0, log2CUSize, 0, 1 ) | |
| transform_coeff( x0, y0, log2CUSize, 0, 2 ) | |
| } | |

HEVC WD3 defines syntax for a transform tree as:

|  | Descriptor |
|---|---|
| transform_tree( x0, y0, log2TrafoSize, trafoDepth, blkIdx ) { | |
| if ( trafoDepth = = 0 && IntraSplitFlag = = 0) { | |
| if( !entropy_coding_mode_flag && PredMode != MODE_INTRA ) { | |
| cbp_yuv_root | vlc(n,v) |
| cbf_luma[ x0 ][ y0 ] [trafoDepth ] = cbp_yuv_root & 1 | |
| cbf_cb[x0][y0] [trafoDepth ] = (cbp_yuv_root >> 1) & 1 | |
| cbf_cr[x0][y0] [trafoDepth ] = (cbp_yuv_root >> 2) & 1 | |
| residualDataPresentFlag = (cbp_yuv_root != 0) | |
| } else { | |
| if( PredMode != MODE_INTRA ) | |
| no_residual_data_flag | u(1) \| ae(v) |
| residualDataPresentFlag = !no_residual_data_flag | |
| } | |
| } | |
| else { | |
| residualDataPresentFlag = TRUE | |
| } | |
| if ( residualDataPresentFlag) { | |
| intraSplitFlag = ( IntraSplitFlag && trafoDepth = = 0 ? 1 : 0 ) | |
| else { | |
| if( log2TrafoSize <= Log2MaxTrafoSize && log2TrafoSize > Log2MinTrafoSize && trafoDepth < maxDepth && !intraSplitFlag ) | |
| split_transform_flag[ x0 ][ y0 ][ trafoDepth ] | u(1) \| ae(v) |
| if( PredMode != MODE_INTRA && log2TrafoSize <= Log2MaxTrafoSize && entropy_coding_mode_flag ) { | |
| firstChromaCbf = ( log2TrafoSize = = Log2MaxTrafoSize \|\| trafoDepth = = 0 ? 1 : 0 ) | |
| if( firstChromaCbf \|\| log2TrafoSize > Log2MinTrafoSize ) { | |
| xBase = x0 − ( x0 & ( ( 1 << log2TrafoSize ) − 1 ) ) | |
| yBase = y0 − ( y0 & ( ( 1 << log2TrafoSize ) − 1 ) ) | |
| if( firstChromaCbf \|\| cbf_cb[ xBase ][ yBase ][ trafoDepth − 1 ] ) | |
| cbf_cb[ x0 ][ y0 ][ trafoDepth ] | u(1) \| ae(v) |
| if( firstChromaCbf \|\| cbf_cr[ xBase ][ yBase ][ trafoDepth − 1 ] ) | |
| cbf_cr[ x0 ][ y0 ][ trafoDepth ] | u(1) \| ae(v) |
| } | |
| } | |
| if( split_transform_flag[ x0 ][ y0 ][ trafoDepth ] ) { | |
| x1 = x0 + ( ( 1 << log2TrafoSize ) >> 1 ) | |
| y1 = y0 + ( ( 1 << log2TrafoSize ) >> 1 ) | |
| transform_tree( x0, y0, log2TrafoSize − 1, trafoDepth + 1, 0 ) | |
| transform_tree( x1, y0, log2TrafoSize − 1, trafoDepth + 1, 1 ) | |

-continued

| | Descriptor |
|---|---|
| transform_tree( x0, y1, log2TrafoSize − 1, trafoDepth + 1, 2 ) <br> transform_tree( x1, y1, log2TrafoSize − 1, trafoDepth + 1, 3 ) <br> } else if( entropy_coding_mode_flag ){ <br> if( PredMode = = MODE_INTRA \| \| trafoDepth != 0 \| \| cbf_cb[ x0 ][ y0 <br> ][ trafoDepth ] \| \| cbf_cr[ x0 ][ y0 ][ trafoDepth ] ) <br> cbf_luma[ x0 ][ y0 ][ trafoDepth ] | u(1) \| ae(v) |
| if( PredMode = = MODE_INTRA ) <br> if( log2TrafoSize > Log2MinTrafoSize ) { <br> cbf_cb[ x0 ][ y0 ][ trafoDepth ] | u(1) \| ae(v) |
| cbf_cr[ x0 ][ y0 ][ trafoDepth ] | u(1) \| ae(v) |
| } else if( blkIdx = = 0 ) { <br> cbf_cb[ x0 ][ y0 ][ trafoDepth − 1 ] | u(1) \| ae(v) |
| cbf_cr[ x0 ][ y0 ][ trafoDepth − 1 ] | u(1) \| ae(v) |
| } <br> } <br> } <br> if( !entropy_coding_mode_flag && PredMode == MODE_INTRA) { <br> cbp_yuv_root | vlc(n,v) |
| cbf_luma[ x0 ][ y0 ] [ 0 ] = cbp_yuv_root & 1 <br> cbf_cb[x0][y0] [ 0 ] = (cbp_yuv_root >> 1) & 1 <br> cbf_cr[x0][y0] [ 0 ] = (cbp_yuv_root >> 2) & 1 <br> } <br> } | |

HEVC WD3 indicates that a variable log 2CUSize for a current coding unit specifies the size of the current coding unit.

Generally, for intra coding in HEVC, all the leaf-TUs belonging to a leaf-CU share the same intra prediction mode. That is, the same intra-prediction mode is generally applied to calculate predicted values for all TUs of a leaf-CU. For intra coding, video encoder 22 may calculate a residual value for each leaf-TU using the intra prediction mode, as a difference between the portion of the predictive values corresponding to the TU and the original block. The residual value may be transformed, quantized, and scanned. For inter coding in HEVC, video encoder 22 may perform prediction at the PU level and may calculate a residual for each PU. The residual values corresponding to a leaf-CU may be transformed, quantized, and scanned. For inter coding, a leaf-TU may be larger or smaller than a PU. For intra coding, a PU may be collocated with a corresponding leaf-TU. In some examples, the maximum size of a leaf-TU may be the size of the corresponding leaf-CU.

As described above, the HEVC standard allows for transformations according to transformation units (TUs), which may be different for different CUs. The TUs are typically sized based on the size of PUs within a given CU defined for a partitioned LCU, although this may not always be the case. The TUs are typically the same size or smaller than the PUs. Pixel difference values associated with the TUs may be transformed to produce transform coefficients, which may be quantized. Further, quantization may be applied according to a quantization parameter (QP) defined at the LCU level. Accordingly, the same level of quantization may be applied to all transform coefficients in the TUs associated with different PUs of CUs within an LCU. However, rather than signal the QP itself, a change or difference (i.e., a delta) in the QP may be signaled with the LCU to indicate the change in QP relative to that of a previous LCU.

Video encoder 22 may perform video encoding of pictures, frames, slices, portions of frames, groups of pictures, or other video data by using LCUs, CUs, PUs and TUs defined according to the HEVC standard as units of video coding information.

For example, video encoder 22 may encode one or more pictures of video data comprising largest coding units (LCUs), wherein the LCUs are partitioned into a set of block-sized coded units (CUs) according to a quadtree partitioning scheme. Video encoder 22 and video decoder 28 may use CUs that have varying sizes consistent with the HEVC standard. For example, video encoder 22 may use possible CU sizes of 64×64, 32×32, 16×16, 8×8 and 4×4 pixels. For a given video sequence, video encoder 22 may use a maximum CU size of 64×64 pixels for all pictures in the video sequence while some pictures in the video sequence may be encoded using a smallest possible CU size of 4×4 pixels while other pictures in the video sequence may be encoded using a smallest CU size of 8×8 pixels.

As described above, references in this disclosure to a CU may refer to a largest coding unit of a picture or a sub-CU of an LCU. Video encoder 22 may split an LCU into sub-CUs, and each sub-CU may be further split into sub-CUs. Video encoder 22 may include syntax data for a bitstream defined to indicate a maximum number of times an LCU is split. The number of time a LCU is split may be referred to as CU depth.

Further, video encoder 22 may also define a smallest coding unit (SCU) for each picture in a video sequence. An SCU may refer to the smallest coding unit size used to code a picture when several possible CU sizes are available. For example, video encoder 22 may be configured to use one of possible CU sizes 64×64, 32×32, 16×16, 8×8 and 4×4 pixels to encode pictures in a video sequence. In one example, all pictures in the video sequence may be encoded using the same SCU size, e.g., 4×4 pixels or 8×8 pixels. In other examples, some pictures in the video sequence may be encoded using a SCU size of 4×4 pixels while other pictures in the video sequence may be encoded using a SCU size of 8×8 pixels. Thus, in this example, pictures in the video sequence may have respective SCUs of 4×4 pixels and 8×8 pixels, i.e., the SCU size may change among frames. Video encoder 22 may determine a minimum SCU or a maximum SCU for a video sequence. In this example, the minimum SCU would be 4×4, while the maximum SCU would be 8×8.

Video encoder 22 may include various levels of syntax data within a bitstream that defines sizes of LCUs, CUs, PUs, TUs, and SCUs. For example, video encoder 22 may signal the size of LCU using sequence level syntax.

In addition to signaling the size of CUs used to encode a picture in a video sequence, video encoder 22 may use various techniques to signal the size of a picture in the video sequence. The size of a picture associated with a video sequence may be equal to a picture size of a decoded picture stored in a decoded picture buffer (DPB). Pictures may have a unit size, such as a block of a selected height and width. The picture size may be picture sizes supported by HEVC or another video standard e.g., picture sizes may include 320×240, 1920×1080, and 7680×4320. Further, video encoder 22 may signal syntax elements for coding texture view components in a slice header. Thus, video encoder 22 may signal the size of a picture associated with a video sequence and/or a minimum smallest coding unit size associated with the video sequence using various syntax elements. Likewise, video decoder 28 may obtain various syntax elements indicating the size of a picture associated with a coded video sequence and/or a minimum smallest coding unit size associated with the coded video sequence and use such syntax elements in decoding the coded video sequence. In one example, video encoder 22 may signal the minimum smallest coding unit size and the size of a picture associated with a video sequence in sequence level syntax information wherein the picture size is a multiple of the minimum smallest coding unit size. In one example, video decoder 28 may obtain a coded video sequence including one or more coded pictures and a minimum smallest coding unit size for the video sequence in sequence level syntax information. Video decoder 28 may decode the coded pictures in the coded video sequence and store the decoded pictures in a decoded picture buffer with a picture size equal to a multiple of the minimum smallest coding unit size.

In some video compression techniques that utilize fixed sized macroblocks (e.g., 16×16), the size of a picture may be signaled in the unit of macroblocks. When the width or height is not equal to a multiple of the fixed sized macroblock, a cropping window may be used. For example, a 1920×1080 picture can be coded as 1920×1088 in the bitstream, but the cropping window signals the real window to make the picture to be displayed as 1920×1080. In other techniques, the size of a picture may be signaled in the unit of pixel. One example of signaling the size of a picture in the unit of pixel is provided by the HEVC standard.

In one example, video encoder 22 and video decoder 28 may code video data where a size of a coded picture in a picture sequence is defined in terms of a particular type of coded unit (CU). The particular types of coded blocks may be a LCU, a SCU, a minimum smallest CU, or a maximum smallest CU of each picture in the sequence of pictures, as described above. More specifically, video encoder 22 may indicate a unit used to signal a size of a picture relative to a size of a coding unit (CU) of the picture. In one example, the unit may be equal to a size of the smallest CU size that is allowed in the coded video sequence. In some cases, the smallest CU size is the same for all pictures in the video sequence. In other cases, the smallest CU size of each picture in the video sequence may be different. In that case, the smallest CU size for each picture in a video sequence may not be smaller than the smallest possible CU size for the video sequence. In another example, the unit indicated by video encoder 22 may be equal to a size of the largest coding unit (LCU) for a group of pictures. In some examples, a cropping window may be applied to the picture by video encoder 22 or video decoder 28 to reduce the size of the picture. The cropping window may crop at least one of a right side or a bottom side of a picture, for example.

In another example, video encoder 22 may signal a picture size relative to an aligned CU (ACU) size. An aligned CU size may be a CU size that is used to specify a picture size of a decoded picture stored in a decoded picture buffer (DPB). Such a picture size may have a width and height both as multiplications of the width and height of the aligned CU size. Similarly, the picture height may be a multiplication of a height of an aligned CU. The size (width and height) of the aligned CU can be signaled in the same way as in the other alternatives. For example video encoder 22 may signal an aligned CUs at various levels of syntax.

An ACU size may defined accord to the following examples: if all pictures in a video sequence have the same SCU size, the ACU may be defined as the SCU size. If, on the other hand, pictures in the video sequence have different SCU sizes, the ACU may be defined as the maximum or minimum SCU size among all pictures. Regardless of how the ACU is defined, the ACU size may be explicitly signaled by video encoder 22 in a sequence parameter set (SPS) or picture parameter set (PPS) associated with the video sequence. In some cases, the ACU size may be restricted such that it is equal to or less than the LCU size for a video sequence and equal to or larger than a SCU size for a video sequence.

Further, in some examples, video encoder 22 may signal a picture size in a unit of LCU or a unit of SCU. In some examples, the unit used to signal a size of a coded picture may be signaled in a SPS. This unit may be equal to the size of a smallest CU size that is allowed for the coded video sequence. In the PPS, the relative size of the smallest CU size for pictures referring to this PPS may be signaled by video encoder 22. In the case where all pictures in a video sequence have the same SCU size, additional signaling of the relative size of the smallest CU may not be necessary in the PPS. In the case where the smallest CU size varies between pictures in a video sequence, a relative smallest CU size for a portion of the pictures in the video sequence may be signaled in the PPS where the relative smallest CU size is larger than the minimum smallest CU for the video sequence. The relative smallest CU size may be signaled in the PPS as a difference between the relative smallest CU size for the portion of the pictures and the minimum smallest CU size for the video sequence.

Alternatively, the picture size can be signaled by video encoder 22 with a unit of LCU in SPS. However, since the cropping window can be further signaled by video encoder 22, using the cropping window may help video decoder identify the picture size, as long as the ACU size is known.

Alternatively, when the SCU size varies for the pictures in the video sequence, the unit may be equal to the size of a maximum smallest CU size allowed in pictures in the coded video sequence. In an example where the maximum CU size is 64×64 pixels, and some pictures have CU size of 4×4 pixels while and others have a smallest CU size of 8×8 pixels, the unit of the picture size may be 8×8 pixels. In this example, if a picture has a size of 64×65 pixels, a picture size would as signaled by video encoder 22 as 8 times 8 pixels by 9 times 8 pixels. Pixels in a picture that exceeded the 64×65 pixel size may be cropped using frame cropping syntax elements.

In some examples, a maximum CU size is 64×64 pixels and some pictures have a smallest possible CU size of 4×4 pixels while others have a smallest CU size of 8×8 pixels. For this example, if the particular type of CU is the minimum possible smallest CU, the unit for the picture size is of 4×4 pixels. Continuing with the example, if the particular type of CU is the maximum possible smallest CU, the unit for the picture size is of 8×8 pixels.

Tables 1-7 below provide example syntax that may be implemented by video encoder 22 and video decoder 28 to perform techniques described herein. Example syntax may be implemented by video encoder 22 and video decoder 28 using hardware, software, firmware, or any combination thereof.

As described above, video encoder 22 may signal the unit used to signal the size of the coded picture in the SPS (Sequence Parameter set). In one example, this unit may be equal to the size of the smallest CU size that is allowed in the coded video sequence. In this example, if the smallest CU size may vary in a coded bitstream between pictures in a group of pictures, the smallest CU size shall not be smaller than the size of this unit. Table 1 below provides an example of SPS raw byte sequence payload (RBSP) syntax used to signal the minimum smallest CU size for the coded picture in the video sequence. In the picture parameter set (PPS), the relative size of the smallest CU size for pictures referring to this PPS may be signaled.

In Table 1, syntax element log 2_max_coding_block_size_minus3 may specify the maximum size of a coding block. A variable Log 2MaxCUSize may be set equal to:

log 2_max_coding_block_size_minus3+3.

In Table 1, syntax element log 2_diff_max_pic_alligned_min_coding_block_size may specify the difference between the minimum size of a coding block in the whole coded video sequence and the maximum size of a coding block. In some cases, a group of pictures may be defined such that a picture in a group of pictures shall not have a smallest coding CU size smaller than the difference value.

A variable Log 2SeqMinCUSize may be set equal to log 2_minmax_coding_block_size_minus3+3−
log 2_diff_max_pic_alligned_min_coding_block_size.

This value may range from 0 to log 2_max_coding_block_size_minus3. Variables Log 2MaxCUSize and Log 2SeqMinCUSize may be used be video encoder 22 and video decoder 28 to process for video coding.

It should be noted that Table 1 includes syntax elements pic_width_in_luma_samples, pic_height_in_luma_samples, and log 2_min_coding_block_size_minus3, which appear in Table 1 with a strikethrough. These syntax elements represent an alternative example where the size of a picture may

TABLE 1

Sequence parameter set RBSP syntax

|  | Descriptor |
|---|---|
| seq_parameter_set_rbsp( ) { |  |
|   profile_idc | u(8) |
|   reserved_zero_8bits /* equal to 0 */ | u(8) |
|   level_idc | u(8) |
|   seq_parameter_set_id | ue(v) |
|   max_temporal_layers_minus1 |  |
|   ~~pic_width_in_luma_samples~~ | ~~u(16)~~ |
|   ~~pic_height_in_luma_samples~~ | ~~u(16)~~ |
|   bit_depth_luma_minus8 | ue(v) |
|   bit_depth_chroma_minus8 | ue(v) |
|   pcm_bit_depth_luma_minus1 | u(4) |
|   pcm_bit_depth_chroma_minus1 | u(4) |
|   log2_max_frame_num_minus4 | ue(v) |
|   pic_order_cnt_type | ue(v) |
|   if( pic_order_cnt_type == 0 ) |  |
|     log2_max_pic_order_cnt_lsb_minus4 | ue(v) |
|   else if( pic_order_cnt_type == 1 ) { |  |
|     delta_pic_order_always_zero_flag | u(1) |
|     offset_for_non_ref_pic | se(v) |
|     num_ref_frames_in_pic_order_cnt_cycle | ue(v) |
|     for( i = 0; i < num_ref_frames_in_pic_order_cnt_cycle; i++ ) |  |
|       offset_for_ref_frame[ i ] | se(v) |
|   } |  |
|   max_num_ref_frames | ue(v) |
|   gaps_in_frame_num_value_allowed_flag | u(1) |
|   log2_~~min~~ max_coding_block_size_minus3 | ue(v) |
|   log2_diff_max_pic_alligned_min_coding_block_size | ue(v) |
|   ~~log2_diff_max_min_coding_block_size~~ | ~~ue(v)~~ |
|   log2_min_transform_block_size_minus2 | ue(v) |
|   log2_diff_max_min_transform_block_size | ue(v) |
|   log2_min_pcm_coding_block_size_minus3 | ue(v) |
|   max_transform_hierarchy_depth_inter | ue(v) |
|   max_transform_hierarchy_depth_intra | ue(v) |
|   chroma_pred_from_luma_enabled_flag | u(1) |
|   loop_filter_across_slice_flag | u(1) |
|   sample_adaptive_offset_enabled_flag | u(1) |
|   adaptive_loop_filter_enabled_flag | u(1) |
|   pcm_loop_filter_disable_flag | u(1) |
|   cu_qp_delta_enabled_flag | u(1) |
|   temporal_id_nesting_flag | u(1) |
|   rbsp_trailing_bits( ) |  |
| } |  | be signaled by the video encoder 22 in the unit of pixels. In one example, where a picture size has a width and height both as multiplications of the width and height of the ACU size, where the ACU size is equal to the minimum SCU of a video sequence, as described above, video decoder 28 may determine whether a bitstream is conforming based on whether a condition the values of pic_width_in_luma_samples, pic_height_in_luma_samples, are integer multiples of log 2_min_coding_block_size_minus3.

Table 2, below, provides another example of a SPS RBSP syntax, in accordance with the techniques that may be performed by video encoder 22 and video decoder 28.

Table 2 specifies a height of a picture as pic_height_in_alligned_scu and a width of the picture as pic_width_in_alligned_scu. pic_width_in_alligned_cu may specify the width of the pictures in the coded video sequence in a unit of aligned CUs. pic_height_in_alligned_cu may specify the height of the pictures in the coded video sequence in a unit of aligned CUs.

log 2_max_coding_block_size_minus3 may specify the maximum size of a coding block. A variable Log 2MaxCUSize may be set equal to log 2_max_coding_block_size_minus3+3.

TABLE 2

Sequence parameter set RBSP syntax

|  | Descriptor |
|---|---|
| seq_parameter_set_rbsp( ) { |  |
|   profile_idc | u(8) |
|   reserved_zero_8bits /* equal to 0 */ | u(8) |
|   level_idc | u(8) |
|   seq_parameter_set_id | ue(v) |
|   max_temporal_layers_minus1 | u(3) |
|   pic_width_in_alligned_scu | ue(v) |
|   pic_height_in_ alligned_scu | ue(v) |
|   bit_depth_luma_minus8 | ue(v) |
|   bit_depth_chroma_minus8 | ue(v) |
|   pcm_bit_depth_luma_minus1 | u(4) |
|   pcm_bit_depth_chroma_minus1 | u(4) |
|   log2_max_frame_num_minus4 | ue(v) |
|   pic_order_cnt_type | ue(v) |
|   if( pic_order_cnt_type == 0 ) |  |
|     log2_max_pic_order_cnt_lsb_minus4 | ue(v) |
|   else if( pic_order_cnt_type == 1 ) { |  |
|     delta_pic_order_always_zero_flag | u(1) |
|     offset_for_non_ref_pic | se(v) |
|     num_ref_frames_in_pic_order_cnt_cycle | ue(v) |
|     for( i = 0; i < num_ref_frames_in_pic_order_cnt_cycle; i++ ) |  |
|       offset_for_ref_frame[ i ] | se(v) |
|   } |  |
|   max_num_ref_frames | ue(v) |
|   gaps_in_frame_num_value_allowed_flag | u(1) |
|   log2_max_coding_block_size_minus3 | ue(v) |
|   log2_diff_max_pic_alligned_min_coding_block_size | ue(v) |
|   log2_min_transform_block_size_minus2 | ue(v) |
|   log2_diff_max_min_transform_block_size | ue(v) |
|   log2_min_pcm_coding_block_size_minus3 | ue(v) |
|   max_transform_hierarchy_depth_inter | ue(v) |
|   max_transform_hierarchy_depth_intra | ue(v) |
|   chroma_pred_from_luma_enabled_flag | u(1) |
|   loop_filter_across_slice_flag | u(1) |
|   sample_adaptive_offset_enabled_flag | u(1) |
|   adaptive_loop_filter_enabled_flag | u(1) |
|   pcm_loop_filter_disable_flag | u(1) |
|   cu_qp_delta_enabled_flag | u(1) |
|   temporal_id_nesting_flag | u(1) |
|   rbsp_trailing_bits( ) |  |
| } |  |

According to Table 2, a width and height of a picture may be indicated by video encoder 22 relative to a width and height of an aligned CU. As described above, an aligned CU may be a CU that is used by video encoder 22 and video decoder 28 to specify a picture size. That is, the picture width may be a multiplication of a width of an aligned CU. As described above, the aligned CU size may be a size used to specify a picture size of a decoded picture stored in a decoded picture buffer (DPB). In some examples, a picture may contain one or more complete aligned CUs. In some examples, the aligned CU is an aligned smallest CU (SCU).

log 2_diff_max_pic_alligned_min_coding_block_size may specify a difference between a minimum size of a coding block in the whole coded video sequence and a maximum size of a coding block. In some examples, any picture may not have a smallest coding CU size smaller than that.

Table 3 below provides additional syntax elements for PPS RBSP that may be implemented by video encoder 22 and video decoder 28 in conjunction with SPS RBSP provided in either Table 1 or Table 2.

TABLE 3

| Picture parameter set RBSP syntax | Descriptor |
|---|---|
| pic_parameter_set_rbsp( ) { | |
|   pic_parameter_set_id | ue(v) |
|   seq_parameter_set_id | ue(v) |
|   entropy_coding_mode_flag | u(1) |
|   num_temporal_layer_switching_point_flags | ue(v) |
|   for( i = 0; i < num_temporal_layer_switching_point_flags; i++ ) | |
|     temporal_layer_switching_point_flag[ i ] | u(1) |
|   num_ref_idx_l0_default_active_minus1 | ue(v) |
|   num_ref_idx_l1_default_active_minus1 | ue(v) |
|   pic_init_qp_minus26 /* relative to 26 */ | se(v) |
|   pic_scu_size_delta | ue(v) |
|   constrained_intra_pred_flag | u(1) |
|   slice_granularity | u(2) |
|   shared_pps_info_enabled_flag | u(1) |
|   if( shared_pps_info_enabled_flag ) | |
|     if( adaptive_loop_filter_enabled_flag ) | |
|       alf_param( ) | |
|   if( cu_qp_delta_enabled_flag ) | |
|     max_cu_qp_delta_depth | u(4) |
|   rbsp_trailing_bits( ) | |
| } | |

In Table 3, pic_scu_size_delta may specify a minimum size of a coding unit of the pictures referring to this picture parameter set. This value may range from 0 to log 2_diff_max_pic_alligned_min_coding_block_size.

The variable Log 2MinCUSize may be set equal to Log 2SeqMinCUSize+pic_scu_size_delta. Alternatively, if the size of the aligned CU is a maximum of the smallest CU sizes of all the pictures, the variable Log 2MinCUSize may be set equal to Log 2SeqMinCUSize−pic_scu_size_delta. Alternatively, if the aligned CU size can be of any possible CU size, in this case, pic_scu_size_delta can be a signed value (se(v)) and the variable Log 2MinCUSize may be set equal to Log 2SeqMinCUSize−pic_scu_size_delta.

In addition to the examples descried above, in one example, an LCU size for a video sequence may be defined as N by N and the ACU size, selected according to one of the examples described above, may be defined as M by M. In this case, the picture size may be signaled by video encoder 22 in the unit of LCU size may be defined as WL by HL. Thus, the picture size with respect to the aligned CU size may be derived by video decoder 28 according to the following equation:

$$(WL*N-\text{crop\_right\_offset}+M-1)/M*M \text{ by } (HL*N-\text{crop\_bottom\_offset}+M-1)/M*M,$$

wherein crop_right_offset and crop_bottom_offset are signaled by video encoder 22 in the cropping window and are the numbers of pixels cropped from the right and bottom boundary, respectively. It should be noted that WL may be the value of the pic_width_in_LCU and WH is the value of pic_height_in_LCU in the Table 5 below. It should also be noted that the operations (e.g., divisions) in the equation above may be integer calculations.

Table 4 below provides another example of additional syntax elements for seq_parameter_set_rbsp( ). In this example, the sizes of one or more pictures may be signaled by video encoder 22 relative to a size of a largest coding unit (LCU). The sizes of the one or more pictures may be signaled by video encoder 22 in the sequence parameter set, for example.

The picture size may also be signaled by video encoder 22 with a num_right_offset_ACU and num_bottom_offset_ACU, so the picture size is (WL*N−M*num_right_offset_ACU) by (HL*N−M*num_bottom_offset_ACU). These two parameters can be signaled in SPS or PPS. The decoded picture is to be stored in the decoded picture buffer with a picture with respect to the aligned CU, which is (WL*N−num_crop_acu_right*M) by (HL*N−num_crop_acu_right*M).

In some examples, a cropping window may be further signaled by video encoder 22. A cropping window may define at least a right side or a bottom side of a picture or other to be cropped. However, since the cropping window can be further signaled, the cropping window may be used to identifying the picture size when the aligned CU size is known.

TABLE 4

| Sequence parameter set RBSP syntax | Descriptor |
|---|---|
| seq_parameter_set_rbsp( ) { | |
|   profile_idc | u(8) |
|   reserved_zero_8bits /* equal to 0 */ | u(8) |
|   level_idc | u(8) |
|   seq_parameter_set_id | ue(v) |
|   max_temporal_layers_minus1 | u(3) |
|   pic_width_in_LCU | ue(v) |
|   pic_height_in_LCU | ue(v) |
|   num_crop_acu_right | ue(v) |
|   num_crop_acu_bottom | ue(v) |

TABLE 4-continued

Sequence parameter set RBSP syntax

| | Descriptor |
|---|---|
| bit_depth_luma_minus8 | ue(v) |
| bit_depth_chroma_minus8 | ue(v) |
| pcm_bit_depth_luma_minus1 | u(4) |
| pcm_bit_depth_chroma_minus1 | u(4) |
| log2_max_frame_num_minus4 | ue(v) |
| pic_order_cnt_type | ue(v) |
| if( pic_order_cnt_type = = 0 ) | |
|    log2_max_pic_order_cnt_lsb_minus4 | ue(v) |
| else if( pic_order_cnt_type = = 1 ) { | |
|    delta_pic_order_always_zero_flag | u(1) |
|    offset_for_non_ref_pic | se(v) |
|    num_ref_frames_in_pic_order_cnt_cycle | ue(v) |
|    for( i = 0; i < num_ref_frames_in_pic_order_cnt_cycle; i++ ) | |
|      offset_for_ref_frame[ i ] | se(v) |
| } | |
| max_num_ref_frames | ue(v) |
| gaps_in_frame_num_value_allowed_flag | u(1) |
| log2_max_coding_block_size_minus3 | ue(v) |
| log2_diff_max_pic_alligned_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| chroma_pred_from_luma_enabled_flag | u(1) |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| frame_cropping_flag | u(1) |
| if( frame_cropping_flag ) { | |
|    frame_crop_left_offset | ue(v) |
|    frame_crop_right_offset | ue(v) |
|    frame_crop_top_offset | ue(v) |
|    frame_crop_bottom_offset | ue(v) |
| } | |
| rbsp_trailing_bits( ) | |
| } | |

In the example show in Table 4, a size of a picture in terms of width and height are given in terms of a largest coding unit (LCU). That is, pic_width_in_LCU may specify a size in pixels of one or more pictures relative to an LCU. Similarly, pic_height_in_LCU may specify a size in pixels of one or more pictures relative to an LCU. The syntax element num_crop_acu_right may be signaled in the cropping window and define a number of pixels to be cropped on a right side of a picture or other video block. Similarly, the syntax element num_crop_acu_bottom may be signaled in the cropping window and define a number of pixels to be cropped on a bottom side of a picture or other video block. In other examples, other sides of cropping windows are signaled.

An example is provided for illustrative purposes only. In this example, the LCU size is N by N and the aligned CU size is M by M. The picture size is signaled in terms of a unit of LCU size is given as WL by HL. In this example, WL is the value of pic_width_in_LCU and HL is the value of pic_height_in_LCU. Crop_right_offset may define a number of pixels to crop on a right side, and may be equal to num_crop_acu_right. Crop_bottom_offset may define a number of pixels to crop on a bottom side, and may be equal to num_crop_acu_bottom.

From the picture size relative to the LCU size and the aligned CU size, the picture size with respect to the aligned CU (ACU) size can be determined from the following equations $$\text{width of picture relative to } ACU = \frac{(WL*N - \text{crop\_right\_offset} + M - 1)}{M} M \quad (1)$$

$$\text{height of picture relative to } ACU = \frac{(HL*N - \text{crop\_bottom\_offset} + M - 1)}{M} M \quad (2)$$

It should be note that the operations in equations 1 and 2 may be integer calculations.

Table 5 provides yet another example of additional syntax elements for pic_parameter_set_rbsp( ). In this example, at least one of num_right_offset_ACU and num_bottom_offset_ACU may be signaled. Table 6 shows num_right_offset_ACU and num_bottom_offset_ACU being signaled in the SPS, however, these values may be signaled elsewhere. For example, at least one of num_right_offset_ACU and num_bottom_offset_ACU may be signaled in a PPS.

TABLE 5

Sequence parameter set RBSP syntax

| | Descriptor |
|---|---|
| seq_parameter_set_rbsp( ) { | |
|   profile_idc | u(8) |
|   reserved_zero_8bits /* equal to 0 */ | u(8) |
|   level_idc | u(8) |
|   seq_parameter_set_id | ue(v) |
|   max_temporal_layers_minus1 | u(3) |
|   pic_width_in_LCU | ue(v) |
|   pic_height_in_LCU | ue(v) |
|   num_crop_acu_right | ue(v) |
|   num_crop_acu_bottom | ue(v) |
|   bit_depth_luma_minus8 | ue(v) |
|   bit_depth_chroma_minus8 | ue(v) |
|   pcm_bit_depth_luma_minus1 | u(4) |
|   pcm_bit_depth_chroma_minus1 | u(4) |
|   log2_max_frame_num_minus4 | ue(v) |
|   pic_order_cnt_type | ue(v) |
|   if( pic_order_cnt_type = = 0 ) | |
|     log2_max_pic_order_cnt_lsb_minus4 | ue(v) |
|   else if( pic_order_cnt_type = = 1 ) { | |
|     delta_pic_order_always_zero_flag | u(1) |
|     offset_for_non_ref_pic | se(v) |
|     num_ref_frames_in_pic_order_cnt_cycle | ue(v) |
|     for( i = 0; i < num_ref_frames_in_pic_order_cnt_cycle; i++ ) | |
|       offset_for_ref_frame[ i ] | se(v) |
|   } | |
|   max_num_ref_frames | ue(v) |
|   gaps_in_frame_num_value_allowed_flag | u(1) |
|   log2_max_coding_block_size_minus3 | ue(v) |
|   log2_diff_max_pic_alligned_min_coding_block_size | ue(v) |
|   log2_min_transform_block_size_minus2 | ue(v) |
|   log2_diff_max_min_transform_block_size | ue(v) |
|   log2_min_pcm_coding_block_size_minus3 | ue(v) |
|   max_transform_hierarchy_depth_inter | ue(v) |
|   max_transform_hierarchy_depth_intra | ue(v) |
|   chroma_pred_from_luma_enabled_flag | u(1) |
|   loop_filter_across_slice_flag | u(1) |
|   sample_adaptive_offset_enabled_flag | u(1) |
|   adaptive_loop_filter_enabled_flag | u(1) |
|   pcm_loop_filter_disable_flag | u(1) |
|   cu_qp_delta_enabled_flag | u(1) |
|   temporal_id_nesting_flag | u(1) |
|   frame_cropping_flag | u(1) |
|   if( frame_cropping_flag ) { | |
|     frame_crop_left_offset | ue(v) |
|     frame_crop_right_offset | ue(v) |
|     frame_crop_top_offset | ue(v) |
|     frame_crop_bottom_offset | ue(v) |
|   } | |
|   rbsp_trailing_bits( ) | |
| } | |

The value num_crop_acu_right in Table 5 may specify a number of aligned CU sizes to be cropped from the LCU aligned picture from the right. The cropped picture may be stored in the DPB. The value num_crop_acu_bottom may specify a number of aligned CU sizes to be cropped from the LCU aligned picture from the bottom, to get the picture to be stored in the DPB.

In an example corresponding with Table 5, the picture size can also be signaled with a num_right_offset_ACU and num_bottom_offset_ACU. The picture size may be determined as:

$$\text{width of picture relative to } ACU = WL(N-M)(\text{num\_right\_offset\_}ACU) \quad (3)$$

$$\text{height of picture relative to } ACU = WL(N-M)(\text{num\_bottom\_offset\_}ACU) \quad (4)$$

A decoded picture that may be stored in a decoded picture buffer with a picture size with respect to the aligned CU may be given as follows:

$$(WL*N-\text{num\_crop\_acu\_right}*M) \text{ by } (HL*N-\text{num\_crop\_acu\_bottom}*M) \quad (5)$$

Thus, a size (height and width in pixels) of the aligned CU may be signaled in the same way as in the examples above with respect to the picture size. For example, if all pictures have the same smallest CU (SCU) size, the size of the aligned CU may be the SCU size. As another example, if the pictures have different SCU sizes, the aligned CU size may be a maximum or a minimum SCU size among all the pictures. The aligned CU size may be signaled explicitly in at least one of the SPS or in the PPS. The aligned CU size may be equal or less than a size of the LCU and equal or larger than the size of the SCU.

Table 6 below provides one example of frame cropping syntax that may be used in conjunction with any of the example embodiments described above. In one example, the cropping window may be in sequence parameter set and follow the same semantics as those in H.264/AVC).

TABLE 6

| Frame Cropping Syntax | | |
|---|---|---|
| frame_cropping_flag | 0 | u(1) |
| if( frame_cropping_flag ) { | | |
|     frame_crop_left_offset | 0 | ue(v) |
|     frame_crop_right_offset | 0 | ue(v) |
|     frame_crop_top_offset | 0 | ue(v) |
|     frame_crop_bottom_offset | 0 | ue(v) |
| } | | |

Figure 2:
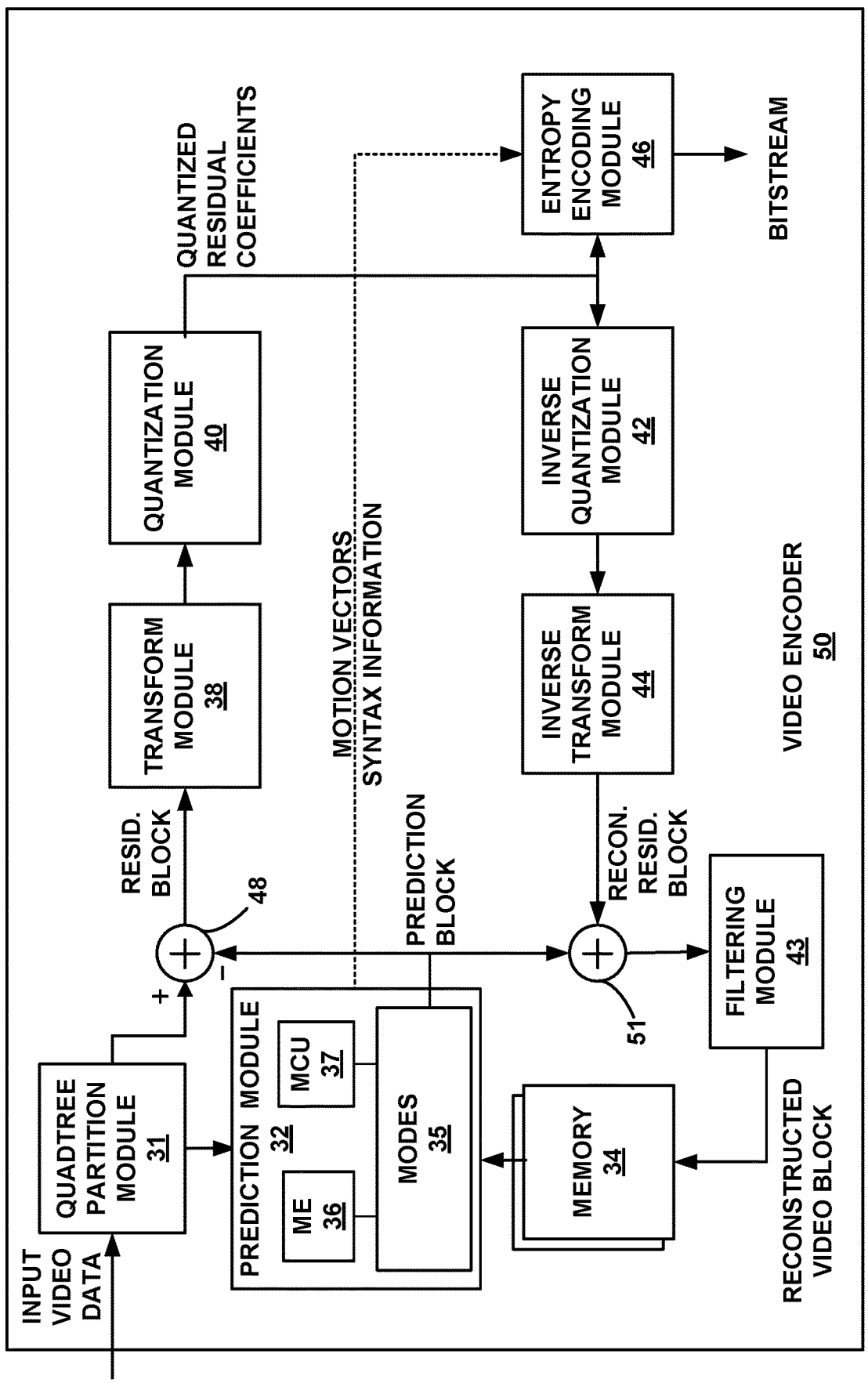
FIG. 2 is a block diagram illustrating an example video encoder that may implement the techniques described in this disclosure.

FIG. 2 is a block diagram illustrating an example video encoder that may be configured to perform the techniques described in this disclosure. Video encoder 50 may be configured to determine a smallest coding unit size for each of a plurality of pictures defining a video sequence, wherein a smallest coding unit size is selected from a plurality of possible coding unit sizes. Further, video encoder 50 may be configured to determine a minimum coding unit size for the video sequence based on the smallest coding unit determined for each of the plurality pictures defining the video sequence. In addition, video encoder 50 may be configured to determine a picture size associated with the video sequence, wherein the picture size associated with the video sequence is an multiple of the minimum coding unit size value. Moreover, video encoder 50 may be configured to signal the minimum coding unit size value in sequence level syntax information.

Video encoder 50 may correspond to video encoder 22 of device 20, or a video encoder of a different device. As shown in FIG. 2, video encoder 50 may include a prediction encoding module 32, quadtree partition module 31, adders 48 and 51, and a memory 34. Video encoder 50 may also include a transform module 38 and a quantization module 40, as well as an inverse quantization module 42 and an inverse transform module 44. Video encoder 50 may also include an entropy encoding module 46, and a filter module 47, which may include deblock filters and post loop and/or in loop filters. The encoded video data and syntax information that defines the manner of the encoding may be communicated to entropy encoding module 46, which performs entropy encoding on the bitstream.

As shown in FIG. 2, prediction encoding module 32 may support a plurality of different coding modes 35 used in the encoding of video blocks. Prediction encoding module 32 may also comprise a motion estimation (ME) module 36 and a motion compensation (MC) module 37.

During the encoding process, video encoder 50 receives input video data. Quadtree partition module 31 may partition units of video data into smaller units. For example, quadtree partition module 31 may break an LCU into smaller CU's and PU's according to HEVC partitioning described above. Prediction encoding module 32 performs predictive coding techniques on video blocks (e.g. CUs and PUs). For inter coding, prediction encoding module 32 compares CUs or PUs to various predictive candidates in one or more video reference frames or slices (e.g., one or more "list" of reference data) in order to define a predictive block. For intra coding, prediction encoding module 32 generates a predictive block based on neighboring data within the same video frame or slice. Prediction encoding module 32 outputs the prediction block and adder 48 subtracts the prediction block from the CU or PU being coded in order to generate a residual block. At least some video blocks may be coded using advanced motion vector prediction (AMVP) described in HEVC.

In some cases, prediction encoding module may include a rate-distortion (R-D) module that compares coding results of video blocks (e.g., CUs or PUs) in different modes. In this case, prediction encoding module 32 may also include a mode selection module to analyze the coding results in terms of coding rate (i.e., coding bits required for the block) and distortion (e.g., representing the video quality of the coded block relative to the original block) in order to make mode selections for video blocks. In this way, the R-D module may provide analysis of the results of different modes to allow the mode selection module to select the desired mode for different video blocks.

Referring again to FIG. 2, after prediction encoding module 32 outputs the prediction block, and after adder 48 subtracts the prediction block from the video block being coded in order to generate a residual block of residual pixel values, transform module 38 applies a transform to the residual block. The transform may comprise a discrete cosine transform (DCT) or a conceptually similar transform such as that defined by the ITU H.264 standard or the HEVC standard. So-called "butterfly" structures may be defined to perform the transforms, or matrix-based multiplication could also be used. In some examples, consistent with the HEVC standard, the size of the transform may vary for different CUs, e.g., depending on the level of partitioning that occurs with respect to a given LCU. Transform units (TUs) may be defined in order to set the transform size applied by transform module 38. Wavelet transforms, integer transforms, sub-band transforms or other types of transforms could also be used. In any case, transform module 38 applies the transform to the residual block, producing a block of residual transform coefficients. The transform, in general, may convert the residual information from a pixel domain to a frequency domain.

Quantization module 40 then quantizes the residual transform coefficients to further reduce bit rate. Quantization module 40, for example, may limit the number of bits used to code each of the coefficients. In particular, quantization module 40 may apply the delta QP defined for the LCU so as to define the level of quantization to apply (such as by combining the delta QP with the QP of the previous LCU or some other known QP). After quantization is performed on residual samples, entropy encoding module 46 may scan and entropy encode the data.

CAVLC is one type of entropy coding technique supported by the ITU H.264 standard and the emerging HEVC standard, which may be applied on a vectorized basis by entropy encoding module 46. CAVLC uses variable length coding (VLC) tables in a manner that effectively compresses serialized "runs" of coefficients and/or syntax elements. CABAC is another type of entropy coding technique supported by the ITU H.264 standard or the HEVC standard, which may be applied on a vectorized basis by entropy encoding module 46. CABAC may involve several stages, including binarization, context model selection, and binary arithmetic coding. In this case, entropy encoding module 46 codes coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding module 46, the encoded video may be transmitted to another device or archived for later transmission or retrieval. The encoded video may comprise the entropy coded vectors and various syntax information. Such information can be used by the decoder to properly configure the decoding process.

Inverse quantization module 42 and inverse transform module 44 apply inverse quantization and inverse transform, respectively, to reconstruct the residual block in the pixel domain. Summer 51 adds the reconstructed residual block to the prediction block produced by prediction encoding module 32 to produce a reconstructed video block for storage in memory 34. Memory 34 may include a decoded picture buffer and reconstructed video blocks may form a decoded picture. Prior to such storage, however, filter module 47 may apply filtering to the video block to improve video quality. The filtering applied by filter module 47 may reduce artifacts and smooth pixel boundaries. Moreover, filtering may improve compression by generating predictive video blocks that comprise close matches to video blocks being coded.

Figure 3:
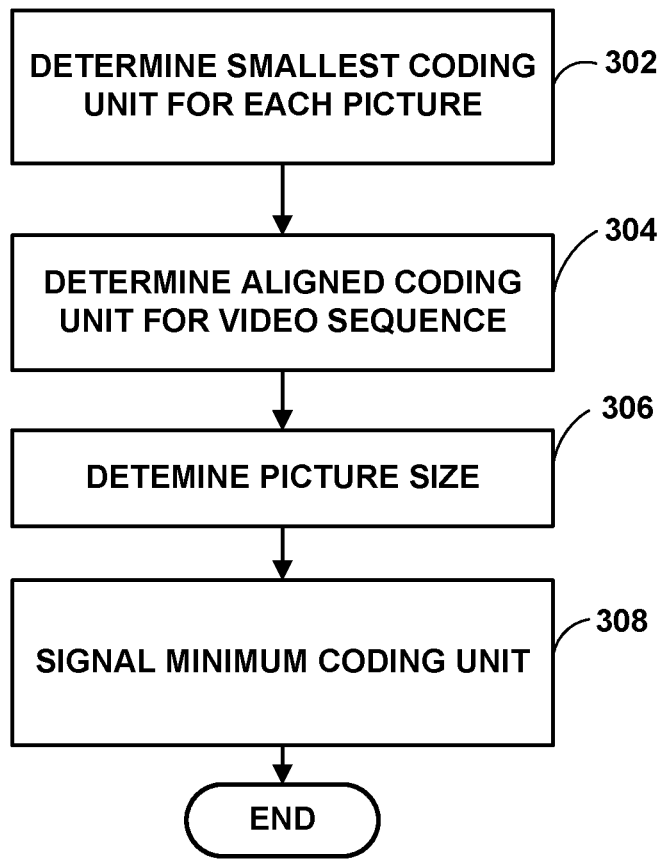
FIG. 3 is a flowchart illustrating an example technique for encoding video data according to the techniques of this disclosure.

FIG. 3 is a flowchart illustrating an example technique for encoding video data that may be performed by video encoder 22 or video encoder 50. Video encoder 20 or video encoder 50 may determine a smallest coding unit size for each of a plurality of pictures defining a video sequence (302). In some cases, a smallest coding unit size may be selected from a plurality of possible coding unit sizes. For example, the smallest coding unit may be one of 4×4, 8×8, 16×16, 32×32 or 64×64, where 64×64 is the maximum possible coding unit size. Video encoder 20 or video encoder 50 may determine an aligned coding unit size for the video sequence from the determined smallest coding units (304). Video encoder 20 of video encoder 50 may determine the aligned coding size based on the techniques described above. Video encoder 20 or video encoder 50 determine a picture size associated with the video sequence, wherein the picture size associated with the video sequence is an multiple of the aligned coding unit size value (306). In some cases the picture size associated with the video sequence may be a picture size of a decoded picture stored in a decoded picture buffer. Video encoder 20 or video encoder 50 may signal the aligned coding unit size value in sequence level syntax information (308).

Figure 4:
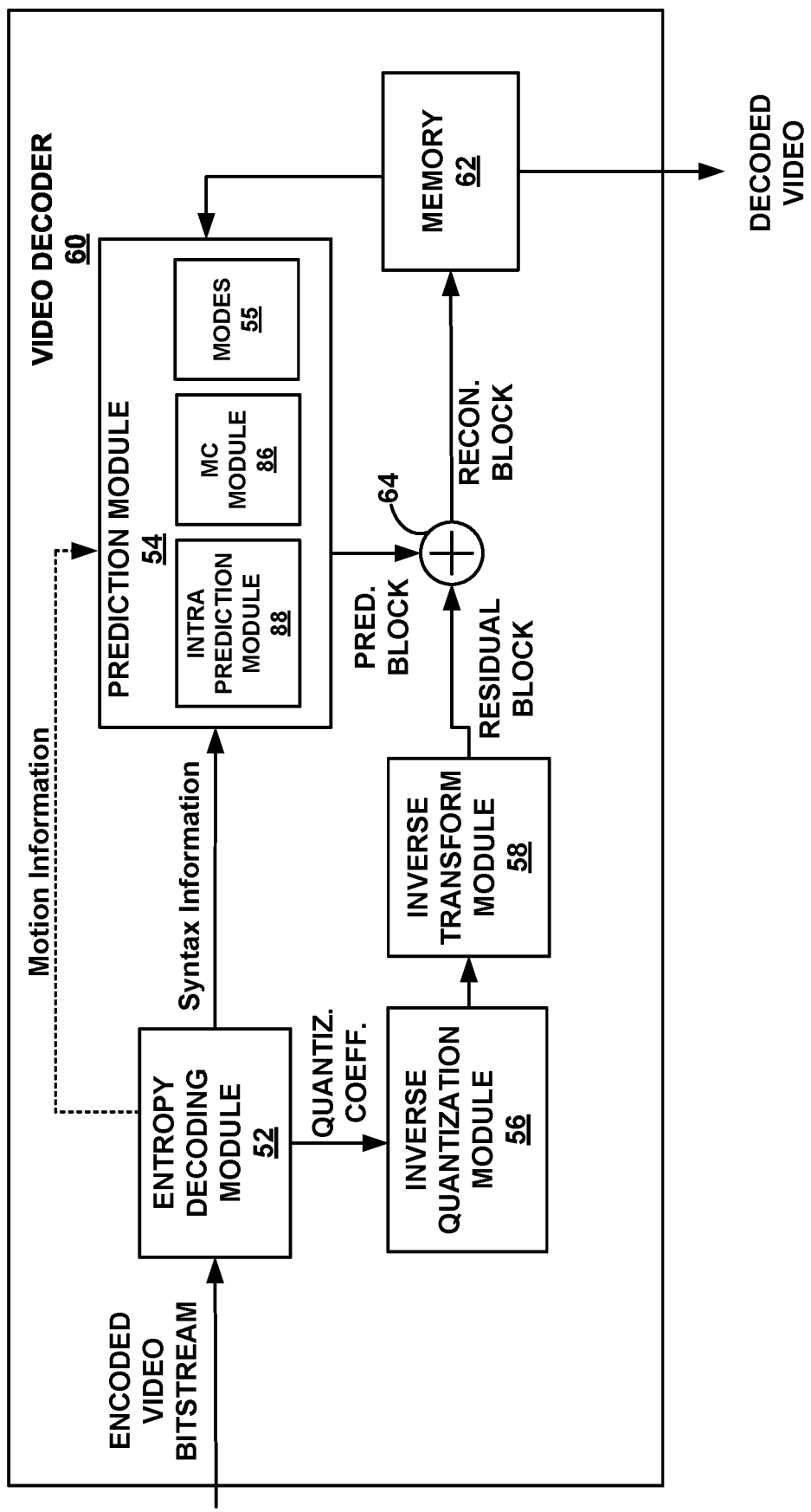
FIG. 4 is a block diagram illustrating an example video decoder that may implement the techniques described in this disclosure.

FIG. 4 is a block diagram illustrating an example of a video decoder 60, which decodes a video sequence that is encoded in the manner described herein. The techniques of this disclosure may be performed by video decoder 60 in some examples. Video decoder 60 may be configured to obtain a coded video sequence including a first picture coded using a first smallest coding unit size and a second picture coded using second smallest coding unit size. Further, video decoder 60 may be configured to obtain a picture size of a decoded picture to be stored in a decoded picture buffer wherein the picture size is a multiple of one of the first coding unit size and the second coding unit size. In addition, video decoder 60 may be configured to store the decoded picture in a decoded picture buffer.

Video decoder 60 includes an entropy decoding module 52, which performs the reciprocal decoding function of the encoding performed by entropy encoding module 46 of FIG. 2. In particular, entropy decoding module 52 may perform CAVLC or CABAC decoding, or any other type of entropy decoding used by video encoder 50. Video decoder 60 also includes a prediction decoding module 54, an inverse quantization module 56, an inverse transform module 58, a memory 62, and a summer 64. In particular, like video encoder 50, video decoder 60 includes a prediction decoding module 54 and a filter module 57. Prediction decoding module 54 of video decoder 60 may include motion compensation module 86, which decodes inter coded blocks and possibly includes one or more interpolation filters for sub-pixel interpolation in the motion compensation process. Prediction decoding module 54 may also include an intra prediction module for decoding intra modes. Prediction decoding module 54 may support a plurality of modes 35. Filter module 57 may filter the output of summer 64, and may receive entropy decoded filter information so as to define the filter coefficients applied in the loop filtering.

Upon receiving encoded video data, entropy decoding module 52 performs reciprocal decoding to the encoding performed by entropy encoding module 46 (of encoder 50 in FIG. 2). At the decoder, entropy decoding module 52 parses the bitstream to determine LCU's and the corresponding partitioning associated with the LCU's. In some examples, an LCU or the CUs of the LCU may define coding modes that were used, and these coding modes may include the bi-predictive merge mode. Accordingly, entropy decoding module 52 may forward the syntax information to prediction unit that identifies the bi-predictive merge mode. Memory 62 may include a decoded picture buffer. Decoded picture buffer may store a decoded picture. The decoded picture may be associated with a video sequences such that the decoder picture is referenced during prediction decoding. Syntax information may be used by video decoder 60 to determine the size of the decoded picture to be stored in the decoded picture buffer according to the techniques described herein.

Figure 5:
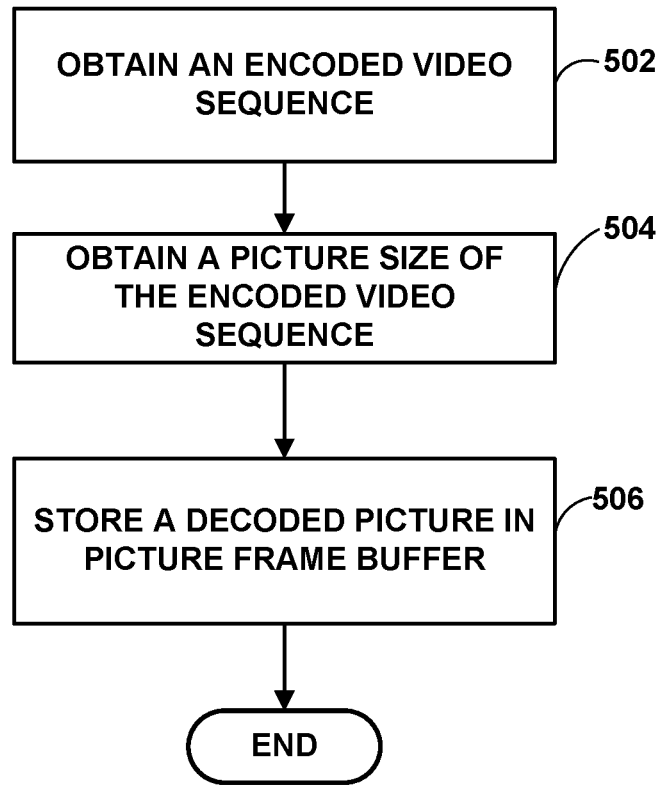
FIG. 5 is a flowchart illustrating an example technique for decoding video data according to the techniques of this disclosure.

FIG. 5 is a flowchart illustrating an example technique for decoding video data that may be performed by video decoder 28 or video decoder 60. Video decoder 28 or video decoder 60 may obtain a coded video sequence including a first picture coded using a first smallest coding unit size and a second picture coded using second smallest coding unit size (502). In one example, first picture may be coded using a smallest coding unit size of 4×4 and second picture may be coded using a smallest coding unit size of 8×8. Video decoder 28 or video decoder 60 may obtain a picture size of a decoded picture to be stored in a decoded picture buffer wherein the picture size is a multiple of one of the first coding unit size, the second coding unit size or a maximum coding unit size (504). In one example, the picture size may be 1920×1080. Video decoder 28 or video decoder 60 may store the decoded picture in a decoded picture buffer (506). Further, video decoder 28 or video decoder 60 may determine whether a bitstream including a video sequence is a conforming bitstream based on whether the obtained picture size is a multiple of the aligned coding unit size.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of encoding video data comprising:
   determining a smallest coding unit size for a video sequence, the video sequence comprising a plurality of pictures, each of the pictures being partitioned into coding units conforming to a coding unit syntax according to respective coding trees including coding unit partition information including split coding unit flags, each of the coding units acting as a respective root node of a respective prediction tree and a respective transform tree, the prediction trees including prediction partitioning information and prediction information for the respective coding unit, the transform trees including transform partitioning information and transform information for the respective coding unit, a first picture of the plurality of pictures being partitioned into first coding units of the coding units, the first coding units including a first smallest coding unit having a first smallest size that is a smallest coding unit size of the first coding units, a second picture of the plurality of pictures being partitioned into second coding units of the coding units, the second coding units including a second coding unit having a second smallest size that is a smallest coding unit size of the second coding units, and determining the smallest coding unit size comprises:
   when the first smallest size is smaller than the second smallest size, determining that the smallest coding unit size is equal to the first smallest size; or
   when the second smallest size is smaller than the first smallest size, determining that the smallest coding unit size is equal to the second smallest size;
   determining a display size for the plurality of pictures of the video sequence;
   determining a picture size of the plurality of pictures of the video sequence such that at least one dimension of the picture size is greater than a corresponding dimension of the display size and such that the picture size is equal to a multiple of the smallest coding unit size;
   determining a multiple value that, when multiplied by the smallest coding unit size, is equal to the picture size;
   signaling, in a video bitstream for the video sequence, the smallest coding unit size as a logarithmically encoded value for a first syntax element of a sequence parameter set (SPS) for the video sequence;
   signaling, in the video bitstream, a largest coding unit (LCU) size used to code the plurality of coded pictures of the coded video sequence as a logarithmically and differentially encoded value for a second syntax element of the SPS;
   signaling, in the video bitstream, the multiple value as a value of a third syntax element of the SPS as the picture size;
   signaling, in the video bitstream, cropping window data indicating an amount by which to crop the plurality of pictures of the video sequence to achieve the display size for the plurality of pictures, the display size being smaller than the picture size;
   encoding the plurality of pictures, including encoding the coding trees, the prediction partition information, the prediction information, the transform partitioning information, and the transform information; and
   outputting the video bitstream including the video sequence.

2. The method of claim 1, the coding units have sizes no larger than a maximum coding unit size of 64×64 pixels.

3. The method of claim 1, the picture size specifying a picture size of a decoded picture stored in a decoded picture buffer.

4. The method of claim 1, the picture size including a picture width determined as a first multiple value of the smallest coding unit size and a picture height determined as a second multiple value of the smallest coding unit size.

5. A method of decoding video data comprising:
   obtaining, from a video bitstream for a coded video sequence, the coded video sequence including a plurality of coded pictures, each of the plurality of coded pictures including a respective plurality of largest coding units (LCUs) including a respective plurality of coding units, each of the coding units corresponding to a respective leaf node of a respective quadtree data structure, and each of the coding units including syntax elements defining prediction data and residual data for a plurality of samples of the corresponding coding unit, each of the coding units having one of a plurality of different coding unit sizes between 4×4 pixels and 64×64 pixels;

decoding, from the video bitstream, a sequence parameter set (SPS), comprising:

decoding a logarithmically encoded value for a first syntax element of the SPS indicating a smallest coding unit size of the plurality of different coding unit sizes used to code the plurality of coded pictures of the coded video sequence, the smallest coding unit size being equal to or larger than 4×4 pixels and smaller than a largest coding unit (LCU) size;

decoding a logarithmically and differentially encoded value for a second syntax element of the SPS representing the LCU size used to code the plurality of coded pictures of the coded video sequence;

decoding a value of a third syntax element of the SPS representing a first integer multiple of the smallest coding unit size represented by the value for the first syntax element of the SPS that specifies a picture width, in luma samples, of the plurality of pictures of the video sequence; and decoding a value of a fourth syntax element of the SPS representing a second integer multiple of the smallest coding unit size represented by the value for the first syntax element of the SPS that indicates a picture height of the plurality of pictures of the video sequence;

decoding the respective quadtree data structures, decoding the respective quadtree data structures comprising decoding split flags of the quadtree data structures at one or more of a plurality of nodes of the quadtree data structures, the split flags representing whether the coding units corresponding to the nodes of the quadtree data structures are partitioned into smaller coding units and determining how the quadtree data structures are partitioned based on both the split flags and the decoded value of the first syntax element of the SPS indicating the smallest coding unit size;

decoding the pictures based on the decoded value of the first syntax element representing the smallest coding unit size, the largest coding unit size determined based on the decoded value of the second syntax element, the decoded value of the third syntax element representing the picture width, and the decoded value of the fourth syntax element representing the picture height, decoding the pictures comprising decoding the coding units of the plurality of pictures, decoding the coding units comprising decoding, for each of the coding units, the syntax elements defining the prediction data and the residual data for the plurality of samples of the corresponding coding units;

decoding cropping window data indicating an amount by which to crop the plurality of pictures of the video sequence to achieve a display size for the plurality of pictures, the display size comprising a display width and a display height, the display width being smaller than the picture width, and the display height being smaller than the picture height;

cropping the decoded pictures according to the cropping window data to form cropped decoded pictures having the display size; and outputting the cropped decoded pictures to a display.

6. The method of claim 5, a first picture of the video sequence having a first smallest coding unit size and a second picture of the video sequence has a second smallest coding unit size, the first smallest coding unit size is less than the second smallest coding unit size, the smallest coding unit size is the first smallest coding unit size, and the picture width and picture height are multiples of the first smallest coding unit size.

7. A device for decoding video data, the device comprising:

a decoded picture buffer configured to store video data; and one or more processors implemented in circuitry and configured to:

obtain, from a video bitstream for a coded video sequence of the video data, the coded video sequence including a plurality of coded pictures, each of the plurality of coded pictures including a respective plurality of largest coding units (LCUs) including a respective plurality of coding units, each of the coding units corresponding to a respective leaf node of a respective quadtree data structure, and each of the coding units including syntax elements defining prediction data and residual data for a plurality of samples of the corresponding coding unit, each of the coding units having one of a plurality of different coding unit sizes between 4×4 pixels and 64×64 pixels;

decode, from the video bitstream, a sequence parameter set (SPS), the one or more processors being configured to:

decode a logarithmically encoded value for a first syntax element of the SPS indicating a smallest coding unit size of the plurality of different coding unit sizes used to code the plurality of coded pictures of the coded video sequence, the smallest coding unit size being equal to or larger than 4×4 pixels and smaller than a largest coding unit (LCU) size;

decode a logarithmically and differentially encoded value for a second syntax element of the SPS representing the LCU size used to code the plurality of coded pictures of the coded video sequence;

decode a value of a third syntax element of the SPS representing a first integer multiple of the smallest coding unit size represented by the value for the first syntax element of the SPS that specifies a picture width, in luma samples, of the plurality of pictures of the video sequence; and decode a value of a fourth syntax element of the SPS representing a second integer multiple of the smallest coding unit size represented by the value for the first syntax element of the SPS that indicates a picture height of the plurality of pictures of the video sequence;

decode the respective quadtree data structures, decoding the respective quadtree data structures comprising decoding split flags of the quadtree data structures at one or more of a plurality of nodes of the quadtree data structures, the split flags representing whether the coding units corresponding to the nodes of the quadtree data structures are partitioned into smaller coding units and determining how the quadtree data structures are partitioned based on both the split flags and the decoded value of the first syntax element of the SPS indicating the smallest coding unit size;

decode the pictures based on the decoded value of the first syntax element representing the smallest coding unit size, the largest coding unit size determined based on the decoded value of the second syntax element, the decoded value of the third syntax element representing the picture width, and the decoded value of the fourth syntax element representing the picture height, decoding the pictures comprising decoding the coding units of the plurality of pictures, decoding the coding units comprising decoding, for each of the coding units, the syntax elements defining the prediction data and the residual data for the plurality of samples of the corresponding coding units;

decode cropping window data indicating an amount by which to crop the plurality of pictures of the video sequence to achieve a display size for the plurality of pictures, the display size comprising a display width and a display height, the display width being smaller than the picture width, and the display height being smaller than the picture height;

crop the decoded pictures according to the cropping window data to form cropped decoded pictures having the display size; and output the cropped decoded pictures to a display.

8. The device of claim 7, a first picture of the video sequence having a first smallest coding unit size and a second picture of the video sequence having a second smallest coding unit size, the first smallest coding unit size is less than the second smallest coding unit size, the smallest coding unit size is the first smallest coding unit size, and the picture width and picture height are multiples of the first smallest coding unit size.

\* \* \* \* \*